United States Patent
Ma et al.

(10) Patent No.: US 7,248,952 B2
(45) Date of Patent: Jul. 24, 2007

(54) MIXED INTEGER LINEAR PROGRAMMING TRAJECTORY GENERATION FOR AUTONOMOUS NAP-OF-THE-EARTH FLIGHT IN A THREAT ENVIRONMENT

(75) Inventors: Cedric Sek-Kong Ma, Los Angeles, CA (US); Robert Henry Miller, Encinitas, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 274 days.

(21) Appl. No.: 11/060,347

(22) Filed: Feb. 17, 2005

(65) Prior Publication Data

US 2006/0184294 A1 Aug. 17, 2006

(51) Int. Cl.
G01C 22/00 (2006.01)
G01S 13/10 (2006.01)

(52) U.S. Cl. .................. 701/25; 701/301; 340/435; 340/436; 342/29

(58) Field of Classification Search .................... 701/1, 701/25, 300–302; 340/425.5, 435–436; 342/29, 342/41
See application file for complete search history.

(56) References Cited

U.S. PATENT DOCUMENTS

| | | | | |
|---|---|---|---|---|
| 5,058,024 A | * | 10/1991 | Inselberg | ..................... 701/301 |
| 5,406,289 A | * | 4/1995 | Barker et al. | ................. 342/96 |
| 5,537,119 A | * | 7/1996 | Poore, Jr. | ..................... 342/96 |
| 6,021,374 A | | 2/2000 | Wood | |
| 6,076,042 A | | 6/2000 | Tognazzini | |
| 6,085,147 A | | 7/2000 | Myers | |
| 6,222,464 B1 | | 4/2001 | Tinkel et al. | |
| 6,259,988 B1 | | 7/2001 | Galkowski et al. | |
| 6,266,610 B1 | | 7/2001 | Schultz et al. | |
| 6,317,690 B1 | | 11/2001 | Gia | |
| 6,401,038 B2 | | 6/2002 | Gia | |
| 6,404,380 B2 | | 6/2002 | Poore, Jr. | |
| 6,512,976 B1 | | 1/2003 | Sabatino et al. | |
| 6,577,947 B1 | | 6/2003 | Kronfeld et al. | |

FOREIGN PATENT DOCUMENTS

WO    WO 95/28650    10/1995

OTHER PUBLICATIONS

T. Schouwenaars et al., "Mixed Integer Programming For Multi-Vehicle Path Planning", *Proceedings of the European Control Conference 2001*, Sep. 2001, pp. 2603-2608.

(Continued)

*Primary Examiner*—Y. Beaulieu
(74) *Attorney, Agent, or Firm*—Robert P. Lenart, Esq.; Pietragalio, Bosick & Gordon LLP

(57) ABSTRACT

A method of planning a path of a vehicle by defining a first plurality of constraints representing dynamics of the vehicle; defining a second plurality of constraints representing collisions with obstacles; defining a third plurality of constraints representing visibility to threats; and using the first, second and third plurality of constraints with mixed integer linear programming to generate a trajectory for a vehicle from a starting point to a destination point in an environment containing the obstacles and the threats.

22 Claims, 6 Drawing Sheets

OTHER PUBLICATIONS

J. Bellingham et al., "Receding Horizon Control of Autonomous Aerial Vehicles", *2002 American Control Conference*, May 2002, 6 pgs.

T. Schouwenaars et al., "Safe Receding Horizon Path Planning For Autonomous Vehicles", *40th Annual Allerton Conference on Communication, Control, and Computing*, Oct. 2002, 10 pgs.

M. G. Earl et al., Modeling and Control of a Multi-Agent System Using Mixed Integer Linear Programming, *Proceedings of the 41st IEEE Conference on Decision and Control*, Dec. 2002, pp. 107-111.

T. Schouwenaars et al., "Hybrid Architecture For Full-Envelope Autonomous Rotocraft Guidance", *Proceedings of the 59th Forum of the American Helicopter Society*, Phoenix, Arizona, May 6-8, 2003, 20 pp.

A. Richards et al., "Experimental Demonstrations of Real-time MILP Control", *AIAA Guidance, Navigation, and Control Conference and Exhibit*, Austin, Texas, Aug. 11-14, 2003, 11 pp.

M. B. Milam, "Real-Time Optimal Trajectory Generation For Constrained Dynamical Systems", Ph.D. thesis, Department of Control and Dynamical Systems, California Institute of Technology, Pasadena, California, 2003, 176 pgs.

* cited by examiner

MIXED INTEGER LINEAR PROGRAMMING TRAJECTORY GENERATION FOR AUTONOMOUS NAP-OF-THE-EARTH FLIGHT IN A THREAT ENVIRONMENT

STATEMENT OF GOVERNMENT INTEREST

This invention was made under contract number F33615-99-C-3613. The United States Government has rights in this invention under the contract.

FIELD OF THE INVENTION

This invention relates to methods for controlling autonomous vehicles, and more particularly to methods for controlling autonomous air vehicles for nap-of-the-earth flight.

BACKGROUND OF THE INVENTION

The technique of using mixed integer linear programming (MILP) for multi-vehicle path planning purposes in an obstacle environment has been recently developed. The technique has been proven useful at least in an experimental context and laboratory systems that implement MILP for path planning have been built as shown in M. G. Earl and R. Dandrea, "Modeling and control of a multi-agent system using mixed integer linear programming", In *Proceedings of the 41st IEEE Conference on Decision and Control*, December 2002.

A mixed integer linear programming (MILP) problem is very similar to a linear programming (LP) problem in that there is a set of linear objective functions and constraints, under which an optimal solution may be found. A MILP problem differs from an LP problem only in that some of the variables are restricted to be integers and thus the solution space for a MILP problem is a subset of that of a similar LP problem (the MILP problem without the integer restrictions). A major advantage of using MILP as a problem formulation is that fast, parallelizable, and commercially available MILP solvers such as ILOG CPLEX are readily available.

Mathematical programming modeling languages such as AMPL, have been developed to take advantage of higher level constructs in expressing a complex problem and the ability to be mapped to multiple solvers, much like a high level computer programming language such as C++ is more versatile for many programmers and can be mapped (or compiled) onto assembly languages for multiple platforms.

T. Schouwenaars, B. De Moor, E. Feron, and J. How, "Mixed integer programming for multi-vehicle path planning", In 2001 *European Control Conference*, September 2001, describes a basic MILP problem formulation combining fuel-optimal path planning for multiple vehicles with double-integrator vehicle dynamics and obstacles in two-dimensional space.

T. Schouwenaars, E. Feron, and J. How, "Safe receding horizon path planning for autonomous vehicles", In 40th *Annual Allerton Conference on Communication, Control, and Computing*, October 2002, guarantees a priori safety for a MILP path planning implementation with fixed obstacles and limited planning horizon length by incorporating safe maneuvers.

J. Bellingham, A. Richards, and J. How, "Receding horizon control of autonomous aerial vehicles", In 2002 *American Control Conference*, May 2002, augments a receding-horizon implementation of MILP path planning with a cost-to-go map in order to avoid entrapment behind relatively large obstacles.

T. Schouwenaars, B. Mettler, E. Feron, and J. How, "Hybrid architecture for full envelope autonomous rotorcraft guidance", In *Proceedings of the 59th Forum of the American Helicopter Society*, May 2003, allows the use of multiple linear time invariant (LTI) modes and discrete finite time maneuvers in a MILP path planning problem as a first step in providing full flight envelope trajectory planning.

The above references do not address path planning in an environment containing threats. There is a need for a method of generating air vehicle flight trajectories for flying over a terrain and avoiding obstacles and with multiple threats.

SUMMARY OF THE INVENTION

This invention provides a method of planning a path of a vehicle comprising the steps of: defining a first plurality of constraints representing dynamics of the vehicle; defining a second plurality of constraints representing collisions with obstacles; defining a third plurality of constraints representing visibility to threats; and using the first, second and third plurality of constraints with mixed integer linear programming to generate a trajectory for a vehicle from a starting point to a destination point in an environment containing the obstacles and the threats.

In another aspect, the invention provides a method of controlling a path of a vehicle, the method comprising the steps of: defining a first plurality of constraints representing dynamics of the vehicle; defining a second plurality of constraints representing collision constraints with obstacles; defining a third plurality of constraints representing visibility to threats; and using the first, second and third plurality of constraints and mixed integer linear programming to generate a set of control actions to move the vehicle from a starting point to a destination point.

DETAILED DESCRIPTION OF THE INVENTION

Figure 1:
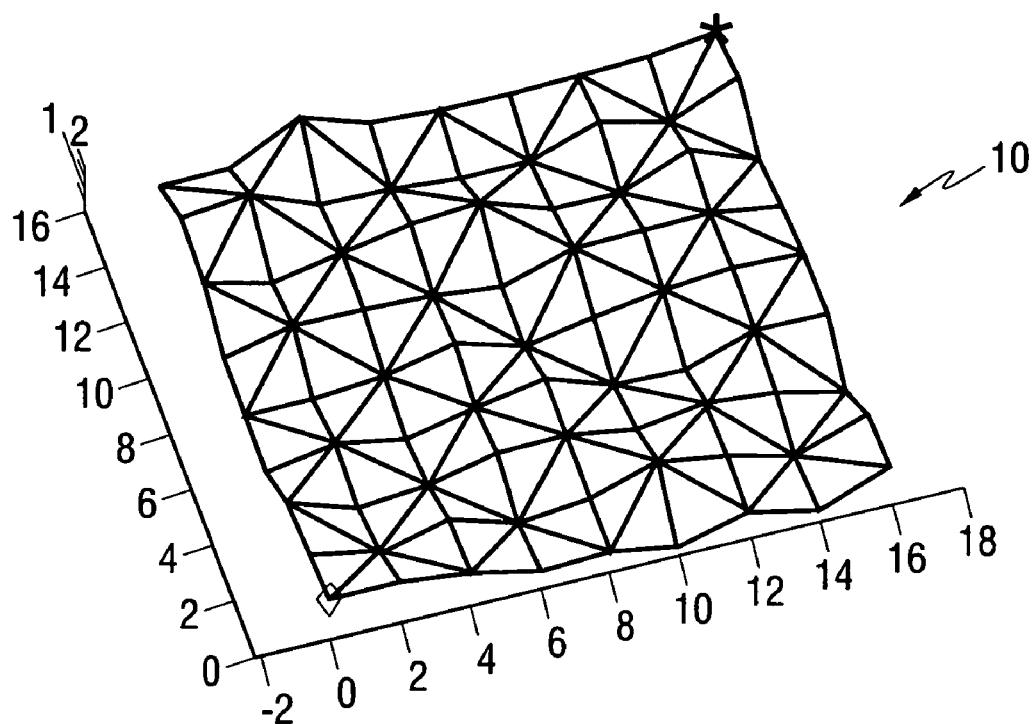
FIG. 1 is a schematic representation of terrain using triangulated irregular networks.

This invention extends a recently developed approach to the optimal path planning of an autonomous vehicle in an obstacle field to three dimensions with specific applications to terrestrial navigation, with obstacle, terrain, and threat avoidance. This approach can be applied to a rotorcraft performing nap-of-the-earth flight in challenging terrain with multiple known surface threats, in both urban and non-urban type settings. Mixed Integer Linear Programming (MILP) is the underlying problem formulation, from which an optimal solution can be obtained through the use of a commercially available MILP solver such as CPLEX. The optimal solution obtained would be optimal in terms of a cost function specified in terms of fuel, time, altitude and threat exposure, and other predefined criteria. A receding horizon implementation of this MILP algorithm can be used to make it feasible to implement in real-time or near real-time. Estimates of the typical problem size and computation time are provided for a rotorcraft nap-of-the-earth flight scenario.

A standard mixed integer linear programming (MILP) problem has the following form:

$$\min f(x) = c^T x \quad (1)$$

$$b_L \leq Ax \leq b_U \quad (2)$$

$$x_L \leq x \leq x_U \quad (3)$$

where $$A \in \Re^{m \times n}, c, x, x_L, x_U \in \Re^n, b_L, b_U \in \Re^m$$

and a subset of x is restricted to be integers. For the constraints of equation (2), the rows corresponding to the portion(s) of x that are restricted to be integers are integer constraints, while the rest of the rows are continuous constraints.

An optimal solution x, if a feasible solution exists, is a vector of variables for which the value under the objective function (1) is smallest, such that x satisfies the constraints (2) and bounds (3). That is, for any other $x^* \neq x$, either $f(x^*) \geq f(x)$, or x does not satisfy at least one of (2), (3), and the integer restriction.

Mixed integer linear programming is especially suited for path planning in an environment with obstacles because the continuous constraints can represent the dynamics of the vehicle, while the integer constraints can represent collision constraints with obstacles.

For linear, time invariant (LTI), continuous time plant dynamics:

$$\dot{s} = A_c s + B_c u \quad (4)$$

and the initial and final conditions are defined to be $s_0$ and $s_F$, respectively.

In particular, and for the rest of this description, the plant dynamics consist of a double integrator model with acceleration as input:

$$\ddot{x} = u_x$$

$$\ddot{y} = u_y$$

$$\ddot{z} = u_z \quad (5)$$

By defining $$v_x = \dot{x}, v_y = \dot{y}, v_z = \dot{z},$$

equations (5) can be rewritten in the form of (4) by setting $$s = [x \; y \; z \; v_x \; v_y \; v_z]^T$$

and $$u = [u_x \; u_y \; u_z]^T$$

to get $$\dot{s} = \begin{bmatrix} 0 & I \\ 0 & 0 \end{bmatrix} s + \begin{bmatrix} 0 \\ I \end{bmatrix} u$$

For the purpose of formulating a trajectory planning problem as an LP or MILP problem, the plant dynamics need to be discretized with a chosen period to yield:

$$s[k+1] = As[k] + Bu[k] \quad (6)$$

Using equation (6) recursively, and assuming the notation $s_k = s[k]$, $u_k = u[k]$, then:

$$s_k = A^k s_0 + A^{k-1} Bu_0 + \ldots + ABu_{k-2} + Bu_{k-1} \quad (7)$$

Assuming a problem with N time steps, then:

$$s_F = s_N$$

Applying this to equation (7) yields a set of destination constraints:

$$s_F = A^N s_0 = A^{N-1} Bu_0 + \ldots + ABu_{N-2} + Bu_{N-1} \quad (8)$$

In the absence of other constraints, a solution to equation (8) is a set of N piecewise constant controls $\{u_0, \ldots, u_{N-1}\}$ that will steer the continuous system (5) from $s_0$ to $s_F$ in N time periods.

Velocity constraints on $v_x$, $v_y$, $v_z$ can be expressed as the following:

$$v_{min} \leq v_k \leq v_{max} \quad (9)$$

where:

$$v = [v_x v_y v_z]^T,$$

$$v_k = v[k] = Vs_k,$$

$$V = [0I],$$

$$v_{min} = [v_{x,min} v_{y,min} v_{z,min}]^T,$$

$$v_{max} = [v_{x,max} v_{y,max} v_{z,max}]^T$$

Applying equations (7) to (9) to obtain the velocity constraints for time $k \in \{0, \ldots, N-1\}$:

$$v_{min} - VA^k s_0 \leq VA^{k-1} Bu_0 + \quad \ldots \quad + VABu_{k-2} + VBu_{k-1} \leq v_{max} - VA^k s_0 \quad (10)$$

Control limits on $(u_x \; u_y \; u_z)$ can be expressed as the following, for $k \in \{0, \ldots, N-1\}$ $$u_{min} \leq u_k \leq u_{max} \quad (11)$$

where: $u_{min} = [U_{x,min} \; u_{y,min} \; u_{z,min}]^T$, $u_{max} = [u_{x,max} \; u_{y,max} \; u_{z,max}]^T$ For a solution that is both fuel and time optimal, we would like the objective function to be the following:

$$f(x) = \sum_{k=0}^{N-1} r \|u_k\|_1 + \sum_{k=1}^{N-1} q \|X_k - X_F\|_1 \quad (12)$$

where:

$$X = [x \; y \; z]^T, \; X_k = X[k] = Ws_k, \; X_F = Ws_F, \; W = [I0]$$

$\|X_k - X_F\|_1$ is the 1-norm distance in (x, y, z) between $s_k$ and $s_F$, and r and q are non-negative weight factors. The first and second term in (12) are known as fuel cost and non-arrival cost, respectively. The non-arrival cost in the objective function is the key to a minimum-time formulation.

Since a 1-norm function is not linear, additional slack variables $v_k$ and $w_k$ can be introduced to create the desired effect with the following constraints:

$$-u_k \leq u_k \leq v_k \qquad (13)$$

$$-w_k \leq W s_k - W s_F \leq w_k \qquad (14)$$

When the constraints (13) and (14) are combined with non-negative weights q and r, they also guarantee that $$v_k = \|u_k\|_1 \text{ and } w_k = \|W S_k - W S_F\|_1 = \|X_k - X_F\|_1$$

respectively, in the optimal solution.

Constraints (13) can be decomposed into two separate inequalities as MILP constraints for $k \in \{0, \ldots, N-1\}$:

$$u_k - u_k \leq 0, \; -u_k - u_k \leq 0 \qquad (15)$$

Similarly, constraints (14) can be decomposed into two separate inequalities, expanded out using equation (7), and written as MILP constraints for $k \in \{1, \ldots, N-1\}$:

$$W(A^{k-1}Bu_0 + \ldots + ABU_{k-2} + Bu_{k-1}) - w_k \leq W(s_F - A^k s_0)$$

$$-W(A^{k-1}Bu_0 + \ldots + ABu_{k-2} + Bu_{k-1}) - w_k \leq -W(s_F - A^k s_0) \qquad (16)$$

The slack variables defined in (13) and (14), can be used to conveniently express the objective function (12) as:

$$f(x) = r \sum_{k=0}^{N-1} v_k + q \sum_{k=1}^{N-1} w_k \qquad (17)$$

The basic LP trajectory planning problem thus consists of the destination constraints (8), velocity constraints (10), slack variable constraints for energy (15) and time (16), control limits (11), and objective function (17). An optimal solution under these conditions is said to be a set of control actions that would take the system (5) from $s_0$ to $s_F$ in N time periods with minimum cost as defined by (17).

The existing LP problem can be expanded to include obstacle collision constraints. It can be shown that for any arbitrary convex polyhedral bounded by n number of planes in 3-D, the interior of the polyhedral can be represented by the combination of the following set of inequalities:

$$a_1 x + b_1 y + c_1 z > d_1 \qquad (18)$$
$$\vdots$$
$$a_n x + b_n y + c_n z > d_n$$

The collision constraints requiring that $s_k$ be outside the region defined by (18) can be rewritten as:

$$\begin{bmatrix} a_1 & b_1 & c_1 & 0 & 0 & 0 \\ & \vdots & & & & \\ a_n & b_n & c_n & 0 & 0 & 0 \end{bmatrix} s_k - M \begin{bmatrix} b_{k_1} \\ \vdots \\ b_{k_n} \end{bmatrix} \leq \begin{bmatrix} d_1 \\ \vdots \\ d_n \end{bmatrix} \qquad (19)$$

$$b_{k_1} + \cdots + b_{k_n} \leq n - 1 \qquad (20)$$

where $M \gg 0$, is an arbitrarily large number, and $b_{k_1}$ are binary variables. The constraints (19) and (20) essentially negate at least one set of the inequalities in (18) and force $s_k$ to be outside the region defined by (18). By writing (19) in short form as $$\theta_i s_k - M b_k^i \leq \theta'_i$$

for each obstacle i, and by substituting $s_k$ with equation (7), the final MILP obstacle collision constraints for obstacle $$i \in \{1, \ldots, p\}$$

would be, for $k \in \{1, \ldots, N\}$:

$$\theta_i(A^{k-1}Bu_0 + \ldots + ABu_{k-2} + Bu_{k-1}) - M b_k^i \leq \theta'_i - \theta_i A^k s_0$$

$$[1 \ldots 1]_{1 \times n_i} b_k^i \leq n_i - 1$$

$$0 \leq b_k^i \leq 1$$

$$b_k^i \in \text{integers} \qquad (21)$$

The MILP trajectory planning problem with obstacle avoidance includes the constraints in the basic LP trajectory planning problem, i.e. expressions (8), (10), (11), (15), (16), and (17), plus obstacle collision constraints (21).

Assuming that N is the number of time steps, the above MILP problem will consist of $$6 + 3N * 2 + 3(N-1) * 2 + 3N + N \sum_{i=1}^{p} (n_i + 1)$$

constraints, $3N + 3N + 3(N-1)$ continuous variables, and $$N \sum_{i=1}^{p} n_i$$

discrete variables, where p is the number of obstacles and $n_i$ is the number of planes that define obstacle i.

The MILP trajectory planning problem can be implemented in a receding horizon framework to reduce the computational effort required to solve the MILP problem by reducing the problem size. Receding horizon trajectory planning with obstacle avoidance can be implemented as a series of MILP problems. Instead of planning the entire optimal trajectory from $s_0$ to $s_F$, which may be located very far apart and may require many time steps to reach, the problem can be broken down into many subproblems of smaller size with fewer time steps N, such that within each subproblem there is no longer the requirement to reach a particular destination state $s_F$ (destination constraint (8)). Instead, the first subproblem uses $s_0$ as the initial state, and only a subset of the planned trajectory from the first subproblem is executed (i.e. only $s_1$ and $s_2$) Then $s_2$ from the first subproblem is used as the initial state in the second subproblem, and so on, until a subproblem with $s_N = s_F$ is calculated, in which case the entire trajectory of the subproblem is executed and the vehicle reaches the destination.

In order to encourage the overall trajectory, as well as the individual trajectories of each subproblem, to get closer to the destination, an additional term known as "terminal cost" enters the objective function $$f(x) = \sum_{k=0}^{N-1} r\|u_k\|_1 + \sum_{k=1}^{N-1} q\|X_k - X_F\|_1 + p\|X_N - X_F\|_1 \quad (22)$$

The objective function thus becomes:

$$f(x) = r\sum_{k=0}^{N-1} v_k + q\sum_{k=1}^{N-1} w_k + pw_N \quad (23)$$

and to accommodate the term $$\|X_N - X_F\|_1,$$

an additional slack variable $w_N$ is introduced according to equation (14) so that constraints (16) still hold but is now applied through the range $$k \in \{1, \ldots, N-1\}.$$

"Terrain flight" is the tactic of using the terrain's vegetation and man-made objects to degrade the enemy's ability to visually, optically, or electronically detect or locate the aircraft. Nap-of-the-Earth (NOE) flight is a category of terrain flight characterized by maneuvers as close to the earth's surface as vegetation, obstacles, or ambient light will permit. This invention provides a novel method for enabling autonomous NOE flight that not only avoids obstacles but also actively uses them for minimizing detection by known enemy elements.

Terrain flight can be considered to be a variation of obstacle avoidance, with some important differences: (1) obstacles are generally scattered in various locations, while terrain is constantly under the vehicle; (2) it usually suffices to avoid collision with the obstacles, but in terrain flight, the objective is to stay low and out of sight of the enemy. This invention approaches basic terrain flight by constructing the terrain as a series of obstacles that act as three-dimensional "floor tiles" that the vehicle travels over, while introducing an altitude cost to keep the trajectory close to the terrain:

$$f(x) = \sum_{k=0}^{N-1} r\|u_k\|_1 + \sum_{k=1}^{N-1} q\|X_k - X_F\|_1 + p\|X_N - X_F\|_1 + \sum_{k=1}^{N} a_z z_k \quad (24)$$

where $z_k = z[k] = Zs_k$, $Z = [0\ 0\ 1\ 0\ 0\ 0]$ and $a_z$ is a non-negative weight factor. To make the objective function (24) implementable in MILP, slack variables $z_k$ and the following constraints can be introduced by substituting equation (7) in $$ZA^{k-1}Bu_0 + \ldots + ZABu_{k-2} + ZBu_{k-1} - z_k = -ZA^k s_0 \quad (25)$$

Together, expressions (24) and (25) associate a cost to the trajectory proportional to the altitude at each point. By tuning the weight factor $a_z$ against other weight factors r, q, and p in the original objective function (22), NOE flight of varying aggressiveness can be achieved.

In one embodiment of the invention, the terrain can be represented as triangulated irregular networks (TIN), since it is a straightforward way of modeling grid-based terrain. TIN is simply a pattern of similarly oriented triangles that is laid on top of a regular square-based grid pattern, with an elevation assigned to each point on the grid, such as the one shown in FIG. 1. FIG. 1 is a schematic representation of terrain 10 using triangulated irregular networks. In the figures, a diamond represents a starting point and an * represents a destination.

Figure 2:
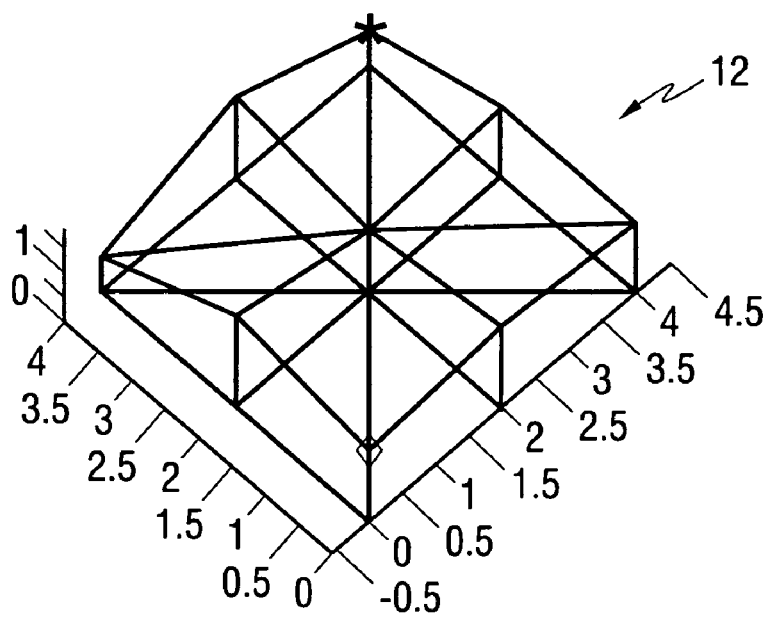
FIG. 2 is a schematic representation of an obstacle using terrain tiles.

A straightforward way of implementing terrain flight in MILP would be to model each triangle in a TIN terrain as an obstacle with three vertical side walls, each of which is positioned adjacent to and directly facing the side wall associated with an adjacent triangle, as illustrated in FIG. 2. FIG. 2 is a schematic representation of an obstacle 12 using terrain tiles.

The points $s_0$ and $s_F$ would be positioned somewhere above the terrain and the trajectory would be required to avoid collision with the terrain while staying as close to the terrain as possible per the objective function.

The threats considered in this context are known as surface or ground threats such as surface-to-air missile (SAM) sites, anti-aircraft artillery (AAA) units, and radar sites. There are various approaches that deal with the problem of threat avoidance. In this broader context, MILP is considered to be unique as a mathematical programming tool because it allows the formulation of a threat avoidance problem that takes both obstacles and terrain into account, which is not the case in the other existing methods.

Figure 5:
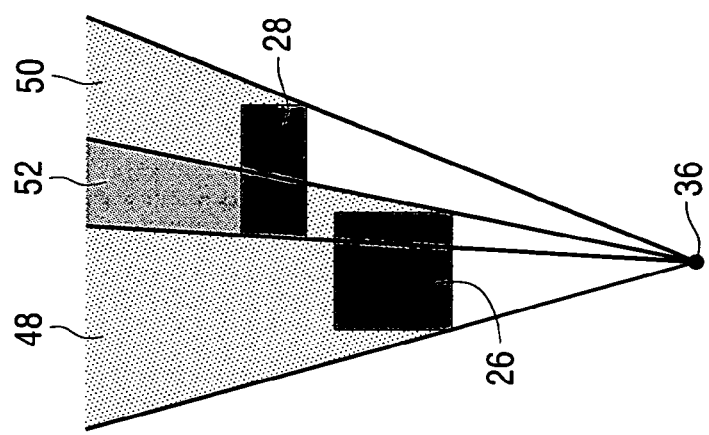
FIGS. 3, 4 and 5 are a schematic representation of safe zones.
Figure 4:
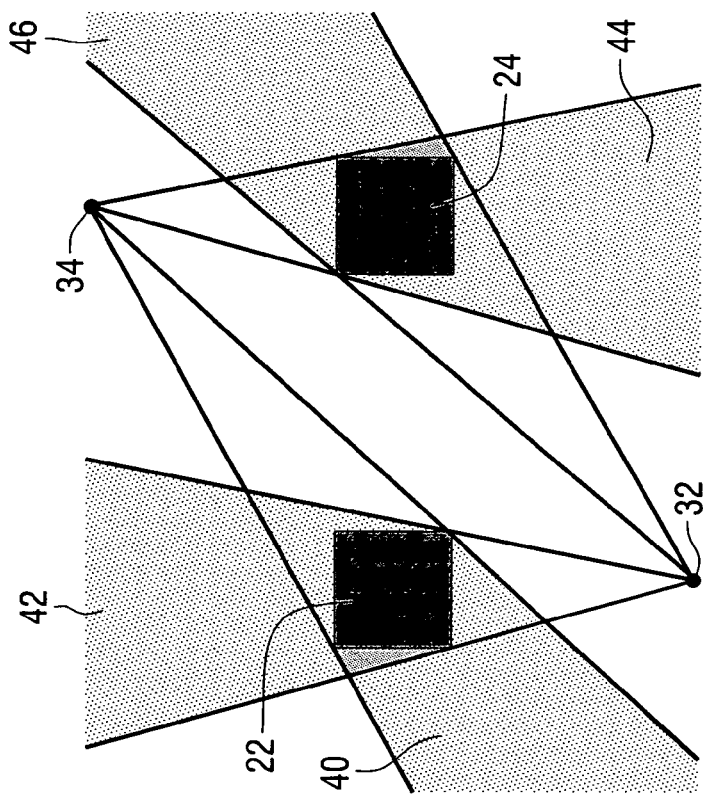
Figure 3:
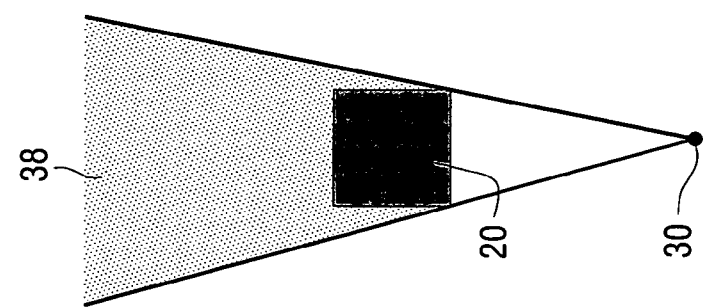

A key premise in this threat avoidance formulation is the assumptions of line-of-sight visibility and opaque objects. Threats are represented by individual points in space whose locations are known and are fixed to the surface of the terrain, although in general they can be fixed anywhere in space. Consider FIGS. 3, 4 and 5 where a threat and an obstacle are present. In FIGS. 3, 4 and 5, items 20, 22, 24, 26 and 28 are obstacles, and points 30, 32, 34 and 36 represent threat positions. The shaded areas 38, 40, 42, 44, 46, 48 and 50 are safe zones. The trajectory generation algorithm aims to take advantage of the "shadow" behind the obstacle and seeks to minimize visibility exposure to all known threats by preferentially selecting routes that are in the shadows as much as possible. This line-of-sight visibility assumption is equally applicable to all threats that use optical and radio-based detection mechanisms such as radar, infrared, and optical sensors. For the purpose of formulating a MILP problem, two types of threat avoidance are considered: absolute and relative. In absolute threat avoidance, visibility exposure to all threats is completely avoided, so that at no time will the vehicle be visible to any known threats. In relative threat avoidance, visibility exposure to all known threats is avoided as much as possible, but a balance is struck between threat exposure and other objective criteria, such as fuel consumption and timely arrival at a target. Because it is not often possible to achieve absolute threat avoidance in a realistic environment with multiple threats, only relative threat avoidance is considered in this description.

FIGS. 3, 4 and 5 are a schematic representation of safe zones. The area 52 with darker shading in FIG. 5 is technically in two different safe zones. This analogy can be extended to a scenario with multiple threats and multiple obstacles, such as the one shown in FIG. 4. In that case, there is one "shadow" corresponding to each combination of threat and obstacle. So for m obstacles and n threats, there are m×n shadows. However, as FIG. 5 shows, these shadows may partially or completely overlap one another, or in some cases, even eclipse or be eclipsed by another.

Theoretically, the MILP logic of threat avoidance can be implemented in two ways: (1) consider the shadows as "safe zones" and formulate the MILP problem to encourage travel within them, or (2) consider the non-shadow regions as "unsafe zones" and formulate the MILP problem to avoid them. For the second implementation, the unsafe zones can be treated as similar to obstacles in a sense that they should be avoided, but in a relative sense. A positive cost can be assigned to each time the trajectory intersects an unsafe zone. With safe zones, on the other hand, a negative cost can be assigned in a similar manner. Though the two approaches initially appear to be very similar, the safe zone formulation is easier to work with due to its inherent desirable geometrical as well as topological properties. As described above, the obstacles are assumed to be convex. Due to this convexity assumption, a safe zone is easily defined. Qualitatively speaking, it is bounded by (1) the set of "front faces" (the sides of an obstacle that are facing the threat), plus (2) the set of planes that intersect both (a) the threat (a point), and (b) the edges of these "front faces" that border the "back faces" (the sides that face away from the threat). FIG. 3 illustrates this in two dimensions. Notice that a corresponding safe zone in three dimensions (for a cube) would be a pyramid of infinite height, minus a smaller pyramid with the "front face" of the cube as its base and sharing the same top. In a single threat, multiple obstacle scenario, the region invisible to the threat, or the overall safe zone, is simply a union of all the safe zones associated with each obstacle and the threat. This holds true even if one obstacle partially or totally blocks another obstacle from view of the threat, such as the case shown in FIG. 5, because once we are inside one of the shadows, we are safe whether or not it is eclipsed by another shadow. Unsafe zones, on the other hand, do not have similar topological properties.

For multiple threats and multiple obstacles, there may exist a region in which one cannot be seen by any threats. This is defined as the intersection of sets of safe zones, with each set corresponding to a different threat, as the darkest region in FIG. 5 illustrates. However, these regions do not always exist, and are useful only for absolute threat avoidance, so they are not relevant to this description. To paint a more mathematical picture of what was just described, point-set topology notation can be used. Suppose there are t threats and o obstacles. There would be t×o safe zones, with each one associated with a single threat and a single obstacle. A safe zone can be labeled with subscript and superscript as in:

$$S_j^i,$$

where, $$i \in \{1, \ldots, o\}$$

denotes the obstacle and, $$j \in \{1, \ldots, t\}$$

denotes the threats. The safe zone corresponding to threat j would be the following:

$$(S_j^1 \cup \ldots \cup S_j^o)$$

Suppose a safe zone is a convex polyhedral bounded by n planes in three dimensions, and the interior of which is represented by the combination of the following set of inequalities:

$$a_1 x + b_1 y + c_1 z \leq d_1$$

·

·

·

$$a_n x + b_n y + c_n z \leq d_n \quad (26)$$

Suppose we have the following constraints:

$$\begin{bmatrix} a_1 & b_1 & c_1 & 0 & 0 & 0 \\ & & \vdots & & & \\ a_n & b_n & c_n & 0 & 0 & 0 \end{bmatrix} s_k - M \begin{bmatrix} b_{k_1} \\ \vdots \\ b_{k_n} \end{bmatrix} \leq \begin{bmatrix} d_1 \\ \vdots \\ d_n \end{bmatrix} \quad (27)$$

$$b_{k_1} + \cdots + b_{k_n} - M b'_k \leq 0 \quad (28)$$

where $M \gg 0$ is an arbitrarily large number, and $b_{k_i}$ and $b'_k$ are binary variables.

It can be easily seen that $b'_k = 0$ implies that $s_k$ is located within the safe zone defined by (26).

By writing (27) in short form as:

$$\theta_{i,j} s_k - M b_k^{i,j} \leq \theta'_{i,j}$$

for each obstacle i and threat j, and by substituting $s_k$ with equation (7), the final MILP threat avoidance constraints for obstacles:

$$i \in \{1, \ldots, o\}$$

and threats:

$$j \in \{1, \ldots, t\}$$

would be, for $k \in \{1, \ldots, N\}$:

$$\theta_{i,j}(A^{k-1}Bu_0 + \ldots + ABu_{k-2} + Bu_{k-1}) - Mb_k^{i,j} \leq \theta'_{i,j} - \theta_{i,j}$$
$$A^k s_0 [1 \ldots 1]_{1 \times n_i} b_k^{i,j} - M b'_k^{i,j} \leq 0 \quad (29)$$

$$0 \leq b_k^{i,j} \leq 1, \ 0 \leq b'_k^{i,j} \leq 1 b_k^{i,j}, \ b'_k^{i,j} \in \text{integers} \ b'_k^{1,j} + \ldots + b'_k^{o,j} - M b_k^j \leq o - 1 \quad (30)$$

From the constraint (30), it can be seen that $b_k^j = 0$ implies that at least one member of the set $$\{b'_k^{1,j}, \ldots, b'_k^{o,j}\}$$

is zero. That is, at time k, the trajectory is hidden from view from threat j behind at least one obstacle. This can be expressed as the following:

$$b_k^j = 0 \Rightarrow s_k \in (S_j^1 \cup \ldots \cup S_j^o) \quad (31)$$

We consider the constraints (29), (30) with an objective function with an additional term added to (24), with $$a_{Tj} > 0: \quad (32)$$

$$f(x) = \sum_{k=0}^{N-1} r \|u_k\|_1 + \sum_{k=1}^{N-1} q \|X_k - X_F\|_1 +$$

$$p \|X_N - X_F\|_1 + \sum_{k=1}^{N} a_z z_k + \sum_{j=1}^{t} a_{Tj} \sum_{k=1}^{N} b_k^j$$

Constraints (29), (30), (31), and (32) guarantee the following:

$$b_k^j = 0 \Leftrightarrow s_k \in (S_j^1 \cup \ldots \cup S_j^o) \quad (33)$$

To establish (33), it suffices to prove the converse of (31). The rationale is that if the trajectory at time k is truly invisible from threat j, or equivalently, $$s_k \in (S_j^1 \cup \ldots \cup S_j^o),$$

then due to the positive cost associated with $$b_k^j = 1$$

in (32), the solution $$b_k^j = 0$$

would be preferred by the solver. Thus, through (29), (30), (31), and (32), we are essentially assigning a positive cost $a_{Tj}$ for each time step k at which the trajectory is visible from threat j. This can be considered an objective penalty on visibility exposure to each separate threat. Notice that the threat exposure cost weight factor $a_{Tj}$ is dependent on the threat j because we allow differential weighting of threats. Threats thought to be further away or of less important can be given a lower weight so that the visibility exposure to certain threats can be emphasized over that to other relatively minor threats.

The implementation of a MILP trajectory planning algorithm based on the problem formulation presented above, can now be described. In particular, the algorithm can use a MILP receding horizon method to generate a terrain-flight trajectory for a helicopter over a grid-based terrain. The first important step toward a realizable MILP generated trajectory is a realistic parametrization of the helicopter performance characteristics. Since we are using double integrator model (5) for vehicle dynamics, we need to specify the helicopter's velocity limits (9) and acceleration limits (11). If a more advanced vehicle model is used in place of (5), then one can more closely parametrize the helicopter characteristics. However, in a MILP problem formulation, the overall vehicle dynamics must be linear, and due to the fact that the equations of motion involves a nonlinear transformation between the body frame and inertial frame, we are largely restricted to modeling the vehicle in the inertial frame. Although it may be possible to derive a linear approximation of the nonlinear equations of motion, or any nonlinear equations for that matter, the technique involves the introduction of new variables that does not scale well with the problem and may lead to intractability. The second important consideration toward a successful MILP algorithm is the selection of weight values in the objective function (22). Because the objective function is the measure by which an optimal solution is determined, the weight values have great influence over the behavior of the optimal MILP trajectory. For each mission type, there is a unique set of weight values that are most suitable for the generation of the appropriate trajectory. For instance, a time-critical mission would have a very different set of weights than that of a fuel-critical mission. With a terrain flight formulation, the altitude weight must be chosen properly with relative to other weights to achieve the desired effect.

Figure 6:
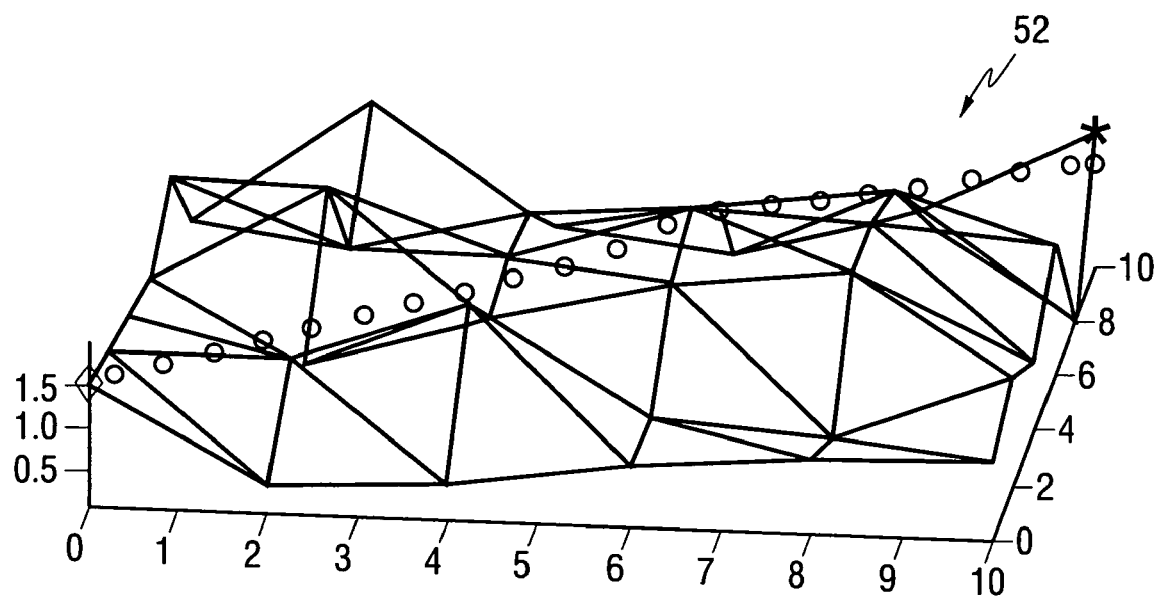
FIG. 6 is a schematic representation of a terrain flight trajectory.
Figure 7:
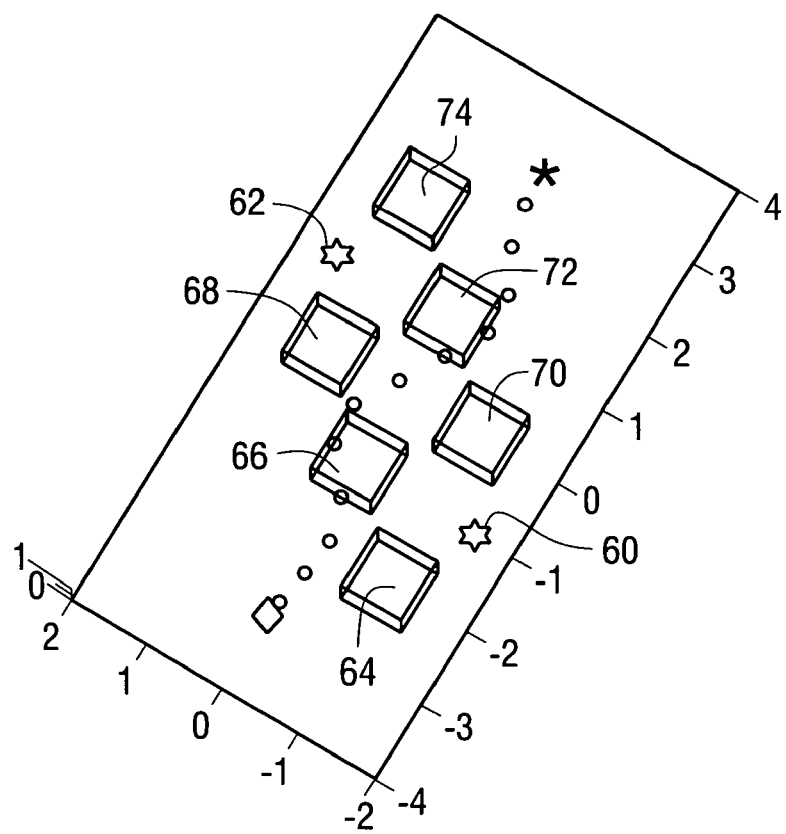
FIG. 7 is a schematic representation of threat avoidance with multiple threats and obstacles.

One embodiment of the invention uses a scenario in which a vehicle with dynamics (5) flies a NOE trajectory over a grid-based terrain with obstacles on top of that terrain, as FIG. 6 illustrates. The MILP problem can be constructed in a MATLAB environment, following the constraints and problem setup outlined above to define the composite vectors and matrices in equations (1), (2), and (3). Then, a text file in the mps format that describes the overall MILP problem is written, and it is read by the CPLEX MILP solver. After the optimal solution is computed, the result is loaded back into MATLAB for plotting and analysis. Since we are using a receding horizon method with a period of one time step, the MILP solver is called repeatedly at the end of each time step. We did not use the multi-resolution terrain triangulation techniques suggested above, but we predict that the application of the multi-resolution technique would yield a lower cost solution where for the same problem size and similar solve time, the NOE trajectory would be able to consider terrain features further away from the vehicle, and the resulting cost would be closer to the global optimum. An example scenario can demonstrate threat avoidance with multiple obstacles and multiple threats has been created. FIG. 7 shows threat avoidance with multiple threats 60 and 62, and obstacles 64, 66, 68, 70, 72 and 74. The optimal trajectory has minimal exposure to the threats (stars).

Figure 8:
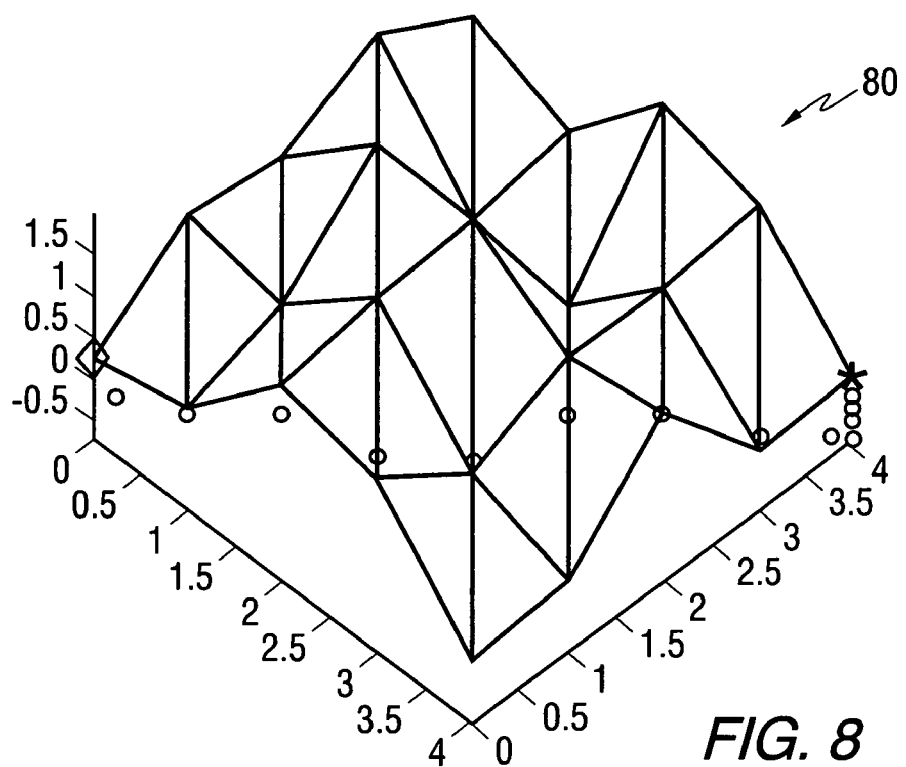
FIG. 8 is a schematic representation of trajectories without terrain overlap.
Figure 9:
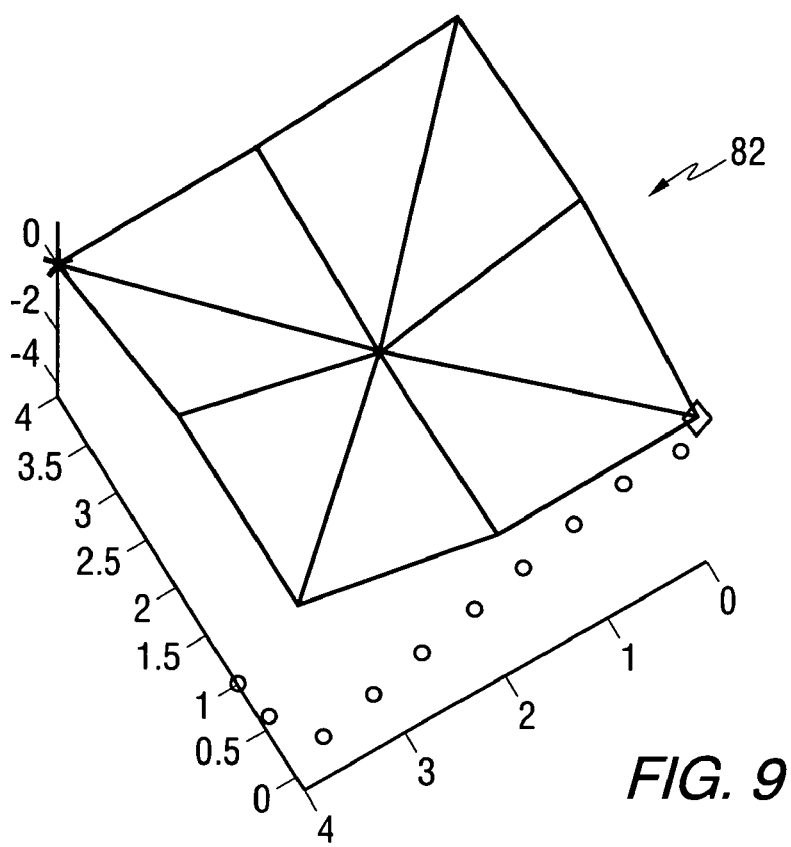
FIG. 9 is a schematic representation of trajectories under a receding horizon.
Figure 10:
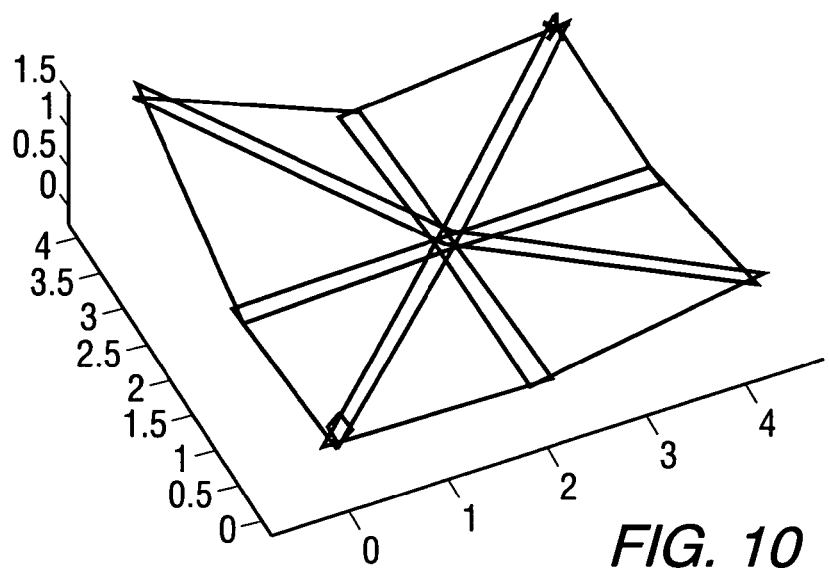
FIG. 10 is a schematic representation of an exaggerated terrain overlap.

Due to the relative complexity in constructing, visualizing, and analyzing the threat avoidance scenario, the example shown in FIG. 7 is intentionally kept very simple, although the MILP solvers are capable of solving more complicated scenarios within a reasonable time. The production of a MILP trajectory such as the one shown in FIGS. 6 and 7, presents a few interesting challenges worthy of mention here. First, since the solution we look for is usually the optimal one, when the MILP problem is not properly constrained, the optimal solution may exhibit undesirable behavior, for instance because the terrain map is defined as a series of triangle "floor tiles" with side walls, the collision constraints in MILP is defined such that a trajectory point on the surface of an obstacle is not considered a collision, without a slight overlap between the triangle "floor tiles." FIG. 8 shows valid trajectories 80 for underconstrained MILP problems without terrain overlap, that go under and between the terrain obstacles. FIG. 9 shows a trajectory 82 under a receding horizon with high altitude cost and no bounding walls. A trajectory shown in FIG. 8 is considered valid by the MILP solver since it does not violate any collision constraints. The apparent solution is to include a finite but small overlap in the definition of terrain blocks, as illustrated in FIG. 10. Similarly, a trajectory in the form of FIG. 9 is equally valid because the solution runs along the edge of the terrain blocks and does not violate any collision constraints. This type of solution is common in a receding horizon context with a high altitude weight value, because seeking a lower altitude would have a higher reward than getting closer to the destination. The solution is to construct four barrier planes surrounding the terrain map. Finally, for a threat avoidance such as the one shown in FIG. 7, due to the way that the obstacles and safe zones are modeled as (18) and (26), respectively, the "front faces," or the surfaces of the obstacles that face the threat, are considered to be both inside the safe zones and outside the obstacles at the same time. The solution to this problem is to move the planar "front faces" of the safe zone slightly inward.

Up to this point, this description has not yet addressed how one goes about implementing the MILP planned trajectory such as the trajectory 52 shown FIG. 6, on an actual flight trajectory. This is where we need to consider the interfaces between MILP and other components in the actual flight hardware and software. In the above description, we have briefly considered the time discretization of a continuous time LTI system leading to equation (6). The issue that the time discretization introduces is the lack of continuity between the points in the planned trajectory. As a result, the obstacle as well as other constraints that are specified in the problem formulation are only enforced at these collocation points in the planned trajectory, and not in-between. In the case of obstacle avoidance, in particular, an optimal solution tends to be one that barely skirts the obstacles in order to minimize the objective function, as FIG. 7 illustrates. Therefore, if one were to follow a series of straight-lines that connect the collocation points, one is likely to collide with the obstacles. The solution to the problem lies in modeling the obstacles as larger than their actual sizes to account for the distance between the collocation points. This technique also addresses a similar issue that arises for a vehicle that is not a point mass. Each obstacle can be similarly expanded according to the dimensions of the vehicle. In addition, in a threat avoidance formulation, one must take care to expand the boundaries of the obstacles while at the same time contract the boundaries of the safe zones by the same amount, the logic being that a non-point-mass vehicle makes it easier to collide with obstacles and more difficult to evade detection. In a more advanced implementation, the vehicle would have one dimension for obstacle avoidance purposes and a separate and smaller one for threat avoidance.

Another fundamental issue that arises is the mechanism with which a vehicle follows the trajectory produced by the MILP problem. This issue is closely related to the selection of the length of period for time discretization, whose tradeoffs are an increased problem size for the same planning horizon vs. a sparser separation of trajectory points. The simplest way to implement a MILP trajectory is to have a waypoint follower track the planned trajectory points one after another. A more advanced technique would involve a nonlinear outer loop that considers the equations of motion as well as the dynamics of the vehicle. We believe that a combination of this advanced nonlinear technique together with a MILP-based approach to path planning provides the best overall closed-loop solution for autonomous nap-of-the-earth flight. An important element of the interface between the MILP path planner and other system components is the input to the MILP path planner. Since the algorithm presented in this description primarily performs the obstacle avoidance function, there must be means to incorporate obstacle data into a MILP-based path planner so that the appropriate MILP problem can be constructed. Most likely, the information would come from an off-line database, processed data from an optical sensor, or a combination of both. However, it is paramount for any constraints to a MILP problem to be as relevant as possible. Therefore, there must be methods devised specifically to select the obstacles that are most relevant to the current MILP problem, that allows a tradeoff of problem size with levels of detail in modeling the environment.

This invention extends a basic three-dimensional MILP obstacle avoidance path planning algorithm to perform terrain flight where staying close to the terrain has just as much priority as avoiding collision with obstacles, and introduces a novel threat avoidance formulation designed to minimize visibility exposure to known threats through proper path planning. Examples of MILP generated trajectories flying over a terrain and avoiding obstacles in both a fixed and receding horizon context have been described, as well as a threat avoidance scenario with multiple threats and obstacles.

The described embodiment of this invention uses a receding horizon approach to solve longer timescale MILP trajectory planning problem, but is restricted to a single vehicle with static obstacles and terrain in three dimensions, and does not have special means to avoid entrapment behind large obstacles. Constraints to the problem have been expressed explicitly in matrix form.

An example problem formulation for optimal trajectory generation in terms of a Mixed Integer Linear Program (MILP) will now be described. We first formulate a simple optimal trajectory generation problem in MILP, then build on it to expand the scope of our problem to include receding horizon, nap-of-the-earth flight, visibility constraints, and safety guarantees. We also include a description of an algorithm to calculate visibility regions.

The Basic Trajectory Planning LP Problem starts with approximate linear plant dynamics:

$$\begin{bmatrix} \dot{x} \\ \dot{y} \\ \dot{z} \\ \dot{v}_x \\ \dot{v}_y \\ \dot{v}_z \end{bmatrix} = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \end{bmatrix} \begin{bmatrix} x \\ y \\ z \\ v_x \\ v_y \\ v_z \end{bmatrix} + \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix} \begin{bmatrix} u_x \\ u_y \\ u_z \end{bmatrix}$$

The problem is formulated as a fixed arrival time problem. Pick a time step ts=TotalTime=N, where N is the number of time steps, and TotalTime is the time in which the vehicle will be driven from its initial state to final state. Then discretize the above dynamics so that:

$$s[k+1]=As[k]+Bu[k]$$

where:

$$s = \begin{bmatrix} x \\ y \\ z \\ v_x \\ v_y \\ v_z \end{bmatrix}, u = \begin{bmatrix} u_x \\ u_y \\ u_z \end{bmatrix}$$

Based on the following initial and final constraints:

$$s_0=[x_0\ y_0\ z_0\ v_{x_0}\ v_{y_0}\ v_{z_0}]^T$$

$$s_F=[x_F\ y_F\ z_F\ v_{x_F}\ v_{y_F}\ v_{z_F}]^T$$

and assuming the notation $s_k$=s[k]; $u_k$=u[k−1], we have the following set of equations:

$$s_1 = As_0 + Bu_1$$
$$s_2 = A^2 s_0 + ABu_1 + Bu_2$$
$$s_3 = A^3 s_0 + A^2 Bu_1 + ABu_2 + Bu_3$$
$$\vdots$$
$$s_k = A^k s_0 + A^{k-1} Bu_1 + \cdots + ABu_{k-1} + Bu_k$$

Since $s_N=s_F$, we have:

$$S_F=A^N s_0+A^{N-1}Bu_1+\ldots+ABu_{N-1}+Bu_N$$

Or in matrix form:

$$\underbrace{[A^{N-1}B \cdots AB\ B]}_{D_A} \underbrace{\begin{bmatrix} u_1 \\ \vdots \\ u_N \end{bmatrix}}_{u} = \underbrace{s_F - A^N s_0}_{D_B}$$

Next consider the Energy Cost Function Slack Variables. The standard linear programming (LP) problem has the following form:

$$\min_x f(x) = c^T x$$

$$b_L \leq Ax \leq b_U$$

$$x_L \leq x \leq x_U$$

but so far we have only derived the following:

$$D_B \leq D_A u \leq D_B$$

One way to implement a minimum-time, minimum energy function is to define the cost function as:

$$f(x) = r(\|u_1\|_1 + \cdots + \|u_N\|_1) + q(d_1(s_1, s_F) + \cdots + d_1(s_{N-1}, s_F))$$

$$= r\left(\left\|\begin{array}{c}u_{1x}\\u_{1y}\\u_{1z}\end{array}\right\|_1 + \cdots + \left\|\begin{array}{c}u_{Nx}\\u_{Ny}\\u_{Nz}\end{array}\right\|_1\right) + q\left(\left\|\begin{array}{c}x_1 - x_F\\y_1 - y_F\\z_1 - z_F\end{array}\right\|_1 + \cdots + \left\|\begin{array}{c}x_{N-1} - x_F\\y_{N-1} - y_F\\z_{N-1} - z_F\end{array}\right\|_1\right)$$

$$= r(\|u_{1x}\| + \|u_{1y}\| + \|u_{1z}\| + \cdots + \|u_{Nx}\| + \|u_{Ny}\| + \|u_{Nz}\|) +$$

$$q(\|x_1 - x_F\| + \|y_1 - y_F\| + \|z_1 - z_F\| + \cdots + \|x_{N-1} - x_F\| +$$

$$\|y_{N-1} - y_F\| + \|z_{N-1} - Z_F\|)$$

where: $d_1(s_1, s_2)$ is the 1-norm distance between 2 points.

One way to implement such an energy function as a linear function is to introduce slack variables w and v such that $$\forall i \in \{1 \ldots N\}, j \in \{1 \ldots N-1\}, k \in \{x,y,z\}:$$

$$-v_{ik} \leq u_{ik} \leq v_{ik}$$

$$-w_{jk} \leq s_{jk} - s_{Fk} \leq w_{jk}$$

(note: $s_{ix} = x_i$, $s_{iy} = y_i$, $s_{iz} = z_i$)

This essentially makes, $$\forall i \in \{1 \ldots N\}, j \in \{1 \ldots N-1\}, k \in \{x,y,z\},$$

$$v_{ik} \geq \|u_{ik}\| \geq 0$$

$$w_{jk} \geq \|s_{jk} - s_{Fk}\| \geq 0$$

By making the cost vector and state vector:

$$c = \begin{bmatrix}0_{3\times 1}\\ \vdots \\ 0_{3\times 1}\\ r_{3\times 1}\\ \vdots \\ r_{3\times 1}\\ q_{3\times 1}\\ \vdots \\ q_{3\times 1}\end{bmatrix} = \begin{bmatrix}0_{3N\times 1}\\ r_{3N\times 1}\\ q_{3(N-1)\times 1}\end{bmatrix}, x = \begin{bmatrix}u_1\\ \vdots \\ u_N\\ v_1\\ \vdots \\ v_N\\ w_1\\ \vdots \\ w_{N-1}\end{bmatrix}$$

We are essentially minimizing $v_{ik}$ and $w_{ik}$ such that $$v_{ik} = \|u_{ik}\| \text{ and } w_{ik} = \|s_{ik} - s_{Fk}\|,$$

or equivalently, $$v_i = \left\|\begin{array}{c}u_{ix}\\u_{iy}\\u_{iz}\end{array}\right\|_1 \text{ and } w_i = \left\|\begin{array}{c}x_i - x_F\\y_i - y_F\\z_i - z_F\end{array}\right\|_1.$$

Therefore we have:

$$f(x) = c^T x$$

$$= r(v_1 + \cdots + v_N) + q(w_1 + \cdots + w_{N-1})$$

$$= r\left(\left\|\begin{array}{c}u_{1x}\\u_{1y}\\u_{1z}\end{array}\right\|_1 + \cdots + \left\|\begin{array}{c}u_{Nx}\\u_{Ny}\\u_{Nz}\end{array}\right\|_1\right) +$$

$$q\left(\left\|\begin{array}{c}x_1 - x_F\\y_1 - y_F\\z_1 - z_F\end{array}\right\|_1 + \cdots + \left\|\begin{array}{c}x_{N-1} - x_F\\y_{N-1} - y_F\\z_{N-1} - z_F\end{array}\right\|_1\right)$$

$$= r(\|u_1\|_1 + \cdots + \|u_N\|_1) + q(d_1(s_1, s_F) + \cdots + d_1(s_{N-1}, s_F))$$

To actually implement the above cost function in matrix form, we observe that for the following inequalities:

$$-v_{ik} \leq u_{ik} \leq v_{ik}$$

$$-w_{jk} \leq s_{jk} - s_{Fk} \leq w_{jk}$$

The equivalent is:

$$u_{ik} - v_{ik} \leq 0$$

$$-u_{ik} - v_{ik} \leq 0$$

$$(s_{jk} - s_{Fk}) - w_{jk} \leq 0$$

$$-(s_{jk} - s_{Fk}) - w_{jk} \leq 0$$

If we sum up $$k: \forall k \in \{x, y\},$$

then we have:

$$u_i - v_i \leq 0_{3\times 1}$$

$$-u_i - v_i \leq 0_{3\times 1}$$

$$(Ws_j - Ws_F) - w_j \leq 0_{3\times 1}$$

$$-(Ws_j - Ws_F) - w_j \leq 0_{3\times 1}$$

where $$W = \begin{bmatrix}1 & 0 & 0 & 0 & 0 & 0\\ 0 & 1 & 0 & 0 & 0 & 0\\ 0 & 0 & 1 & 0 & 0 & 0\end{bmatrix}$$

Since we know:

$$s_k = A^k s_0 + A^{k-1} B u_1 + \ldots + AB u_{k-1} + B u_k$$

We have, after some rearrangements:

$$u_i - v_i \leq 0_{3\times 1}$$

$$-u_i - v_i \leq 0_{3\times 1}$$

$$(WA^{j-1}Bu_1 + \ldots + WABu_{j-1} + WBu_j) - w_j \leq W(s_F - A^j s_0)$$

$$-(WA^{j-1}Bu_1 + \ldots + WABu_{j-1} + WBu_j) - w_j \leq -W(s_F - A^j s_0)$$

Or in matrix form:

$$\begin{bmatrix} I^{3\times 3} & & \\ & \ddots & \\ & & I^{3\times 3} \end{bmatrix} \begin{bmatrix} u_1 \\ \vdots \\ u_N \end{bmatrix} - \begin{bmatrix} I^{3\times 3} & & \\ & \ddots & \\ & & I^{3\times 3} \end{bmatrix} \begin{bmatrix} \upsilon_1 \\ \vdots \\ \upsilon_N \end{bmatrix} \leq$$

$$\begin{bmatrix} 0_{3\times 1} \\ \vdots \\ 0_{3\times 1} \end{bmatrix} - \begin{bmatrix} I^{3\times 3} & & \\ & \ddots & \\ & & I^{3\times 3} \end{bmatrix} \begin{bmatrix} u_1 \\ \vdots \\ u_N \end{bmatrix} - \begin{bmatrix} I^{3\times 3} & & \\ & \ddots & \\ & & I^{3\times 3} \end{bmatrix} \begin{bmatrix} \upsilon_1 \\ \vdots \\ \upsilon_N \end{bmatrix} \leq \begin{bmatrix} 0_{3\times 1} \\ \vdots \\ 0_{3\times 1} \end{bmatrix}$$

$$\begin{bmatrix} WB & \cdots & 0 & 0 \\ \vdots & \ddots & 0 & 0 \\ WA^{N-2}B & \cdots & WB & 0 \end{bmatrix} \begin{bmatrix} u_1 \\ \vdots \\ u_N \end{bmatrix} - \begin{bmatrix} I^{3\times 3} & & \\ & \ddots & \\ & & I^{3\times 3} \end{bmatrix} \begin{bmatrix} w_1 \\ \vdots \\ w_{N-1} \end{bmatrix} \leq$$

$$\begin{bmatrix} W(s_F - As_0) \\ \vdots \\ W(s_F - A^{N-1}s_0) \end{bmatrix} - \begin{bmatrix} WB & \cdots & 0 & 0 \\ \vdots & \ddots & 0 & 0 \\ WA^{N-2}B & \cdots & WB & 0 \end{bmatrix} \begin{bmatrix} u_1 \\ \vdots \\ u_N \end{bmatrix} -$$

$$\begin{bmatrix} I^{3\times 3} & & \\ & \ddots & \\ & & I^{3\times 3} \end{bmatrix} \begin{bmatrix} w_1 \\ \vdots \\ w_{N-1} \end{bmatrix} \leq - \begin{bmatrix} W(s_F - As_0) \\ \vdots \\ W(s_F - A^{N-1}s_0) \end{bmatrix}$$

If we define:

$$W_A = \begin{bmatrix} WB & \cdots & 0 & 0 \\ \vdots & \ddots & 0 & 0 \\ WA^{N-2}B & \cdots & WB & 0 \end{bmatrix}, W_B = \begin{bmatrix} W(s_F - As_0) \\ \vdots \\ W(s_F - A^{N-1}s_0) \end{bmatrix}$$

$$u = \begin{bmatrix} u_1 \\ \vdots \\ u_N \end{bmatrix}, \upsilon = \begin{bmatrix} \upsilon_1 \\ \vdots \\ \upsilon_N \end{bmatrix}, w = \begin{bmatrix} w_1 \\ \vdots \\ w_{N-1} \end{bmatrix}, x = \begin{bmatrix} u \\ \upsilon \\ w \end{bmatrix}$$

And introduce an upper bound $u_{max}$ to $u$ such that $\forall i, k$:

$$-u_{max} \leq u_{ik} \leq u_{max}$$

Then the LP problem formulation becomes:

$$\min_x f(x) = \begin{bmatrix} 0_{3N\times 1} \\ r_{3N\times 1} \\ q_{3(N-1)\times 1} \end{bmatrix}^T \begin{bmatrix} u \\ \upsilon \\ w \end{bmatrix}$$

$$\begin{bmatrix} D_B \\ -\infty_{3N\times 1} \\ -\infty_{3N\times 1} \\ -\infty_{3(N-1)\times 1} \\ -\infty_{3(N-1)\times 1} \end{bmatrix} \leq \begin{bmatrix} D_A & 0 & 0 \\ I^{3N\times 3N} & -I^{3N\times 3N} & 0 \\ -I^{3N\times 3N} & -I^{3N\times 3N} & 0 \\ W_A & 0 & -I^{3(N-1)\times 3(N-1)} \\ -W_A & 0 & -I^{3(N-1)\times 3(N-1)} \end{bmatrix}$$

$$\begin{bmatrix} u \\ \upsilon \\ w \end{bmatrix} \leq \begin{bmatrix} D_B \\ 0_{3N\times 1} \\ 0_{3N\times 1} \\ W_B \\ -W_B \end{bmatrix}$$

$$\begin{bmatrix} -u_{max\ 3N\times 1} \\ -\infty_{3N\times 1} \\ -\infty_{3(N-1)\times 1} \end{bmatrix} \leq \begin{bmatrix} u \\ \upsilon \\ w \end{bmatrix} \leq \begin{bmatrix} u_{max\ 3N\times 1} \\ \infty_{3N\times 1} \\ \infty_{3(N-1)\times 1} \end{bmatrix}$$

The velocity constraints consist of an octagon-shaped bound on the velocity on the x-y plane and a max bound on the z component:

$$-v_{h,max} \leq v_x[k] \leq v_{h,max}$$

$$-v_{h,max} \leq v_y[k] \leq v_{h,max}$$

$$-v_{z,max} \leq v_z[k] \leq v_{z,max}$$

$$-\sqrt{2}v_{h,max} \leq v_x[k] + v_y[k] \leq \sqrt{2}v_{h,max}$$

$$-\sqrt{2}v_{h,max} \leq v_x[k] - v_y[k] \leq \sqrt{2}v_{h,max}$$

Since $$v_x[k] = [0\ 0\ 0\ 1\ 0\ 0]s_k$$

$$v_y[k] = [0\ 0\ 0\ 0\ 1\ 0]s_k$$

$$v_z[k] = [0\ 0\ 0\ 0\ 0\ 1]s_k$$

we can have the following constraints:

$$-\begin{bmatrix} v_{h,max} \\ v_{h,max} \\ v_{z,max} \\ v_{h,max} \\ v_{h,max} \end{bmatrix} \leq \begin{bmatrix} 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & \frac{1}{\sqrt{2}} & \frac{1}{\sqrt{2}} & 0 \\ 0 & 0 & 0 & \frac{1}{\sqrt{2}} & -\frac{1}{\sqrt{2}} & 0 \end{bmatrix} s_k \leq \begin{bmatrix} v_{h,max} \\ v_{h,max} \\ v_{z,max} \\ v_{h,max} \\ v_{h,max} \end{bmatrix}$$

We set:

$$V = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & \frac{1}{\sqrt{2}} & \frac{1}{\sqrt{2}} & 0 \\ 0 & 0 & 0 & \frac{1}{\sqrt{2}} & -\frac{1}{\sqrt{2}} & 0 \end{bmatrix}, V_{max} = \begin{bmatrix} v_{h,max} \\ v_{h,max} \\ v_{z,max} \\ v_{h,max} \\ v_{h,max} \end{bmatrix}$$

Since we know:

$$s_k = A^k s_0 + A^{k-1} Bu_1 + \ldots + ABu_{k-1} + Bu_k$$

We have, for each time k:

$$-V_{max} \leq VA^k s_0 + VA^{k-1} Bu_1 + \ldots + VABu_{k-1} + VBu_k \leq V_{max}$$

Or in matrix form after rearrangements:

$$-V_{max} - VA^k s_0 \leq [V\ A^{k-1}B\ \cdots\ V\ AB\ V\ Bu_k] \begin{bmatrix} u_1 \\ \vdots \\ u_k \end{bmatrix} \leq V_{max} - VA^k s_0$$

The composite form would be:

$$\begin{bmatrix} -V_{max} - V As_0 \\ \vdots \\ -V_{max} - V A^N s_0 \end{bmatrix} \leq \begin{bmatrix} VB & 0 & \cdots & 0 \\ VAB & VB & \ddots & 0 \\ \vdots & & \ddots & 0 \\ VA^{N-1}B & \cdots & VAB & VB \end{bmatrix} \begin{bmatrix} u_1 \\ \vdots \\ u_k \end{bmatrix} \leq$$

-continued $$\begin{bmatrix} V_{max} - VAs_0 \\ \vdots \\ V_{max} - VA^N s_0 \end{bmatrix}$$

Or in short form:

$V_{B_L} \leq V_A u \leq V_{B_U}$

Next consider the Obstacle Integer Constraints. Assume a rectangular box in 3-D defined by:

$x_{min} \leq x \leq x_{max}$ $y_{min} \leq y \leq y_{max}$ $z_{min} \leq z \leq z_{max}$ We introduce binary variables be $b_* \in \{0, 1\}$ and a number $M \gg 0$ sufficiently large such that:

$x - Mb_{x_{min}} \leq x_{min}$ $y - Mb_{y_{min}} \leq y_{min}$ $z - Mb_{z_{min}} \leq z_{min}$ $-x - Mb_{x_{max}} \leq -x_{max}$ $-y - Mb_{y_{max}} \leq -y_{max}$ $-z - Mb_{z_{max}} \leq -z_{max}$ $b_{x_{min}} + b_{y_{min}} + b_{z_{min}} + b_{x_{max}} + b_{y_{max}} + b_{z_{max}} \leq 5$ The above constraints ensure that (x, y, z) is outside the box because the last inequality requires at least one of the binary variables $b_*$ to be zero, which negates at least one of the inequalities that we established for a point to be inside the box, which also implies that the point (x, y, z) lies outside at least one of the six box boundaries.

The object above is described by 6 Euclidean planar inequalities. The above concept can be generalized to an object that may be defined by non-Euclidean planar inequalities. A non-Euclidean plane in 3-D can be described by the following equation:

$z = ax + by + d$

We can turn the non-Euclidean planar inequalities into integer obstacle constraints:

$z \leq ax + by + d_{min} \Leftrightarrow -ax - by + z - Mb_{d_{min}} \leq d_{min}$ $z \geq ax + by + d_{max} \Leftrightarrow ax + by - z - Mb_{d_{max}} \leq -d_{max}$ For ease of manipulation, we turn the Euclidean as well as non-Euclidean inequalities described above into matrix form by introducing the following auxiliary matrices and variables:

$\theta_{x_{min}} = [1\ 0\ 0\ 0\ 0\ 0],\ \theta'_{x_{min}} = x_{min}$ $\theta_{x_{max}} = [-1\ 0\ 0\ 0\ 0\ 0],\ \theta'_{x_{max}} = -x_{max}$ $\theta_{y_{min}} = [0\ 1\ 0\ 0\ 0\ 0],\ \theta'_{y_{min}} = y_{min}$ $\theta_{y_{max}} = [0\ -1\ 0\ 0\ 0\ 0],\ \theta'_{y_{max}} = -y_{max}$ $\theta_{z_{min}} = [0\ 0\ 1\ 0\ 0\ 0],\ \theta'_{z_{min}} = z_{min}$ $\theta_{z_{max}} = [0\ 0\ -1\ 0\ 0\ 0],\ \theta'_{z_{max}} = -z_{max}$ $\theta_{d_{min}} = [-a\ -b\ 1\ 0\ 0\ 0],\ \theta'_{d_{min}} = d_{min}$ $\theta_{d_{max}} = [a\ b\ -1\ 0\ 0\ 0],\ \theta'_{d_{max}} = -d_{max}$ such that for any n-sided arbitrary convex polyhedral at time k, we have the following inequalities:

$\theta_1 s_k - Mb_{k_1} \leq \theta'_1$ $\vdots$ $\theta_n s_k - Mb_{k_n} \leq \theta'_n$ $b_{k_1} + \cdots + b_{k_n} \leq n - 1$ If we set:

$$\theta = \begin{bmatrix} \theta_1 \\ \vdots \\ \theta_n \end{bmatrix},\ b_k = \begin{bmatrix} b_{k_1} \\ \vdots \\ b_{k_n} \end{bmatrix},\ \theta' = \begin{bmatrix} \theta'_1 \\ \vdots \\ \theta'_n \end{bmatrix}$$

The above inequalities become:

$\theta s_k - Mb_k \leq \theta'$ $b_{k_1} + \ldots + b_{k_n} \leq n - 1$

Figure 11:
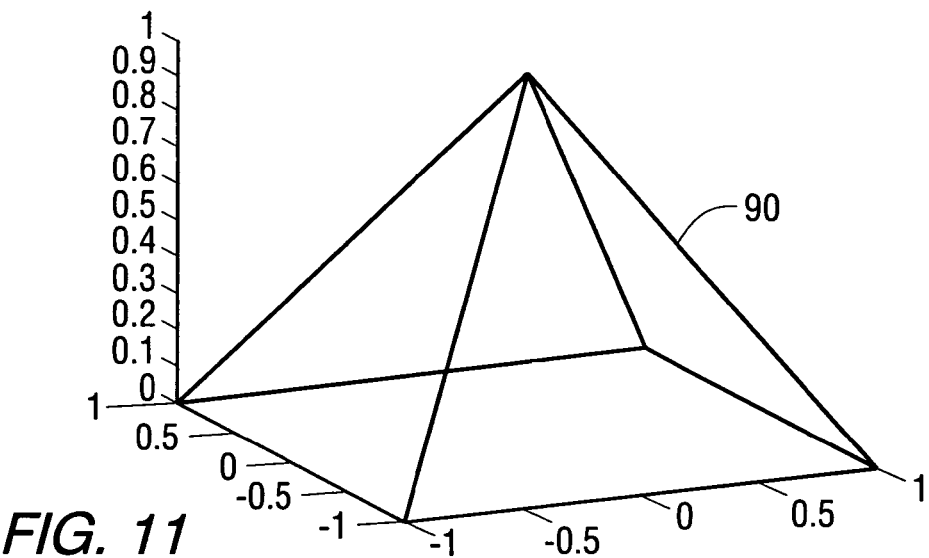
FIG. 11 is a schematic representation of pyramid used to explain the method of the invention.

We illustrate the above with a simple example. Suppose we have a pyramid (n=5) defined by the following inequalities (as shown in FIG. 11):

$z < -x + 1$ $z < x + 1$ $z < -y + 1$ $z < y + 1$ $z > 0$

For a point (x, y, z) to be outside the pyramid, at least 4 of the following 5 inequalities must be true:

$z \geq -x + 1$ $z \geq x + 1$ $z \geq -y + 1$ $z \geq y + 1$ $z \leq 0$ we have the following constraints:

$-x - z - Mb_1 \leq -1$ $x - z - Mb_2 \leq -1$ $-y - z - Mb_3 \leq -1$ $y - z - Mb_4 \leq -1$ $z - Mb_5 \leq 0$ $b_1 + b_2 + b_3 + b_4 + b_5 \leq 5 - 1 = 4$ $b_1, b_2, b_3, b_4, b_5 \in \{0, 1\}$ We can arrive at the same conclusion by using the auxiliary matrices and variables:

$$z \geq -x+1 \Leftrightarrow a = -1, b = 0, d_{max} = 1 \Leftrightarrow \underbrace{[-1 \; 0 \; -1 \; 0 \; 0 \; 0]}_{\theta_1} s_k - M b_{k_1} \leq \underbrace{-1}_{\theta'_1}$$

$$z \geq x+1 \Leftrightarrow a = 1, b = 0, d_{max} = 1 \Leftrightarrow \underbrace{[1 \; 0 \; -1 \; 0 \; 0 \; 0]}_{\theta_2} s_k - M b_{k_2} \leq \underbrace{-1}_{\theta'_2}$$

$$z \geq -y+1 \Leftrightarrow a = 0, b = -1, d_{max} = 1 \Leftrightarrow \underbrace{[1 \; -1 \; -1 \; 0 \; 0 \; 0]}_{\theta_1} s_k - M b_{k_3} \leq \underbrace{-1}_{\theta'_3}$$

$$z \geq y+3 \Leftrightarrow a = 0, b = 1, d_{max} = 1 \Leftrightarrow \underbrace{[0 \; 1 \; -1 \; 0 \; 0 \; 0]}_{\theta_4} s_k - M b_{k_4} \leq \underbrace{-1}_{\theta'_4}$$

$$z \leq 0 \Leftrightarrow z_{min} = 0 \Leftrightarrow \underbrace{[0 \; 0 \; 1 \; 0 \; 0 \; 0]}_{\theta_5} s_k - M b_{k_5} \leq \underbrace{0}_{\theta_4}$$

In matrix form, this becomes:

$$\underbrace{\begin{bmatrix} -1 & 0 & -1 & 0 & 0 & 0 \\ 1 & 0 & -1 & 0 & 0 & 0 \\ 0 & -1 & -1 & 0 & 0 & 0 \\ 0 & 1 & -1 & 0 & 0 & 0 \\ 0 & 0 & 1 & 0 & 0 & 0 \end{bmatrix}}_{\theta} s_k - M \underbrace{\begin{bmatrix} b_{k_1} \\ b_{k_2} \\ b_{k_3} \\ b_{k_4} \\ b_{k_5} \end{bmatrix}}_{b_k} \leq \underbrace{\begin{bmatrix} -1 \\ -1 \\ -1 \\ -1 \\ 0 \end{bmatrix}}_{\theta'}$$

Recall from previous sections that $$s_k = A^k s_0 + A^{k-1} B u_1 + \ldots + A B u_{k-1} + B u_k$$

The inequality above can be rewritten as:

$$\theta A^k s_0 + \theta A^{k-1} B u_1 + \ldots + \theta A B u_{k-1} + \theta B u_k - M b_k \leq \theta'$$

Or in matrix form:

$$[\theta A^{k-1} B \; \cdots \; \theta A B \; \theta B] \begin{bmatrix} u_1 \\ \vdots \\ u_k \end{bmatrix} - M b_k \leq \theta' - \theta A^k s_0$$

If we sum up all the inequalities for k time steps, we have the following composite constraints:

$$\begin{bmatrix} \theta B & 0 & \cdots & 0 \\ \theta AB & \theta B & \ddots & \vdots \\ \vdots & & \ddots & 0 \\ \theta A^{N-1} B & \cdots & \theta AB & \theta B \end{bmatrix} \begin{bmatrix} u_1 \\ \vdots \\ u_N \end{bmatrix} + \begin{bmatrix} -M I^{n \times n} & 0 & \cdots & 0 \\ 0 & \ddots & \ddots & \vdots \\ \vdots & \ddots & \ddots & 0 \\ 0 & \cdots & 0 & -M I^{n \times n} \end{bmatrix} \begin{bmatrix} b_1 \\ \vdots \\ b_N \end{bmatrix} \leq$$

$$\begin{bmatrix} b_1 \\ \vdots \\ b_N \end{bmatrix} \leq \begin{bmatrix} \theta' - \theta A s_0 \\ \vdots \\ \theta' - \theta A^N s_0 \end{bmatrix} \begin{bmatrix} [1 \cdots 1]_{1 \times n} & 0 & \cdots & 0 \\ 0 & \ddots & \ddots & \vdots \\ \vdots & \ddots & \ddots & 0 \\ 0 & \cdots & 0 & [1 \ldots 1]_{1 \times n} \end{bmatrix} \begin{bmatrix} b_1 \\ \vdots \\ b_N \end{bmatrix} \leq \begin{bmatrix} n-1 \\ \vdots \\ n-1 \end{bmatrix}$$

If we define:

$$\theta_{A_1} = \begin{bmatrix} \theta B & 0 & \cdots & 0 \\ \theta AB & \theta B & \ddots & \vdots \\ \vdots & & \ddots & 0 \\ \theta A^{N-1} B & \cdots & \theta AB & \theta B \end{bmatrix},$$

$$\theta_{B_1} = \begin{bmatrix} \theta' - \theta A s_0 \\ \vdots \\ \theta' - \theta A^N s_0 \end{bmatrix}, b = \begin{bmatrix} b_1 \\ \vdots \\ b_N \end{bmatrix}$$

$$\theta_{A_2} = \begin{bmatrix} [1 \cdots 1]_{1 \times n} & 0 & \cdots & 0 \\ 0 & \ddots & \ddots & \vdots \\ \vdots & \ddots & \ddots & 0 \\ 0 & \cdots & 0 & [1 \ldots 1]_{1 \times n} \end{bmatrix}$$

The obstacle constraints become:

$$-\infty_{Nn \times 1} \leq \theta_{A_1} u - M I^{Nn \times Nn} b \leq \theta_{B_1}$$

$$-\infty_{N \times 1} \leq \theta_{A_2} b \leq (n-1)_{N \times 1}$$

Now we consider the case of having multiple obstacles. Since the sets of obstacle constraints corresponding to each vehicle are independent of one another, we only need to introduce additional sets of constraints if we introduce additional obstacles. Suppose we have p obstacles, and that for each obstacle $i \in \{1, \ldots, p\}$, it has $n_i$ sides. By labeling the constraint variables corresponding to each obstacle with a superscript denoting the obstacle, we have the following constraints:

$$-\infty_{Nn_i \times 1} \leq \theta^i_{A_1} u - M I^{Nn_i \times Nn_i} b_i \leq \theta^i_{B_1}$$

$$-\infty_{N \times 1} \leq \theta^i_{A_2} b_i \leq (n_i - 1)_{N \times 1}$$

$$i \in \{1, \ldots, p\}$$

Recall the following from the previous sections:

$$\min_x f(x) = \begin{bmatrix} 0_{3N\times 1} \\ r_{3N\times 1} \\ q_{3(N-1)\times 1} \end{bmatrix}^T \begin{bmatrix} u \\ v \\ w \end{bmatrix} \begin{bmatrix} D_B \\ -\infty_{3N\times 1} \\ -\infty_{3N\times 1} \\ -\infty_{3(N-1)\times 1} \\ -\infty_{3(N-1)\times 1} \end{bmatrix} \le$$

$$\begin{bmatrix} D_A & 0 & 0 \\ I^{3N\times 3N} & -I^{3N\times 3N} & 0 \\ -I^{3N\times 3N} & -I^{3N\times 3N} & 0 \\ W_A & 0 & -I^{3(N-1)\times 3(N-1)} \\ -W_A & 0 & -I^{3(N-1)\times 3(N-1)} \end{bmatrix}$$

$$\begin{bmatrix} u \\ v \\ w \end{bmatrix} \le \begin{bmatrix} D_B \\ 0_{3N\times 1} \\ 0_{3N\times 1} \\ W_B \\ -W_B \end{bmatrix} \begin{bmatrix} -u_{\max\,[3N\times 1]} \\ -\infty_{3N\times 1} \\ -\infty_{3(N-1)\times 1} \end{bmatrix} \le \begin{bmatrix} u \\ v \\ w \end{bmatrix} \le$$

$$\begin{bmatrix} u_{\max\,[3N\times 1]} \\ \infty_{3N\times 1} \\ \infty_{3(N-1)\times 1} \end{bmatrix}$$

$V_{B_L} \le V_A u \le V_{B_U}$ $-\infty_{Nn_i\times 1} \le \theta^i_{A_1} u - M\, I^{Nn_i\times Nn_i} b_i \le \theta^i_{B_1}$ $-\infty_{N\times 1} \le \theta^i_{A_2} b_i \le (n_i - 1)_{N\times 1}$ $i \in \{1,\ldots,p\}$ $$\min_x f(x) = \begin{bmatrix} 0_{3N\times 1} \\ r_{3N\times 1} \\ q_{3(N-1)\times 1} \\ 0_{Nn_1\times 1} \\ \vdots \\ 0_{Nn_p\times 1} \end{bmatrix}^T \begin{bmatrix} u \\ v \\ w \\ b_1 \\ \vdots \\ b_p \end{bmatrix} \begin{bmatrix} D_B \\ -\infty_{3N\times 1} \\ -\infty_{3N\times 1} \\ -\infty_{3(N-1)\times 1} \\ -\infty_{3(N-1)\times 1} \\ V_{B_L} \\ -\infty_{Nn_1\times 1} \\ -\infty_{N\times 1} \\ \vdots \\ -\infty_{Nn_p\times 1} \\ -\infty_{N\times 1} \end{bmatrix} \le$$

$$\begin{bmatrix} D_A & 0 & 0 & 0 & \cdots & 0 \\ I^{3N\times 3N} & -I^{3N\times 3N} & 0 & 0 & \cdots & 0 \\ -I^{3N\times 3N} & -I^{3N\times 3N} & 0 & 0 & \cdots & 0 \\ W_A & 0 & -I^{3(N-1)} & 0 & \cdots & 0 \\ -W_A & 0 & -I^{3(N-1)} & 0 & \cdots & 0 \\ V_A & 0 & 0 & 0 & \cdots & 0 \\ \theta^1_{A_1} & 0 & 0 & -M\, I^{Nn_1\times Nn_1} & & \\ 0 & 0 & 0 & \theta^1_{A_2} & & \\ \vdots & \vdots & \vdots & & \ddots & \\ \theta^p_{A_1} & 0 & 0 & & & -M\, I^{Nn_p\times Nn_p} \\ 0 & 0 & 0 & & & \theta^p_{A_2} \end{bmatrix} \begin{bmatrix} u \\ v \\ w \\ b_1 \\ \vdots \\ b_p \end{bmatrix} \le$$

-continued $$\begin{bmatrix} D_B \\ 0_{3N\times1} \\ 0_{3N\times1} \\ W_B \\ -W_B \\ V_{B_U} \\ \theta_{B_1}^1 \\ (n_1-1)_{N\times1} \\ \vdots \\ \theta_{B_1}^p \\ (n_p-1)_{N\times1} \end{bmatrix} \begin{bmatrix} -u_{\max[3N\times1]} \\ -\infty_{3N\times1} \\ -\infty_{3(N-1)\times1} \\ 0_{Nn_1\times1} \\ \vdots \\ 0_{Nn_p\times1} \end{bmatrix} \leq \begin{bmatrix} u \\ v \\ w \\ b_1 \\ \vdots \\ b_p \end{bmatrix} \leq \begin{bmatrix} u_{\max[3N\times1]} \\ \infty_{3N\times1} \\ \infty_{3(N-1)\times1} \\ 1_{Nn_1\times1} \\ \vdots \\ 1_{Nn_p\times1} \end{bmatrix}$$

Assuming that N is the number of time steps, the above MILP problem has the following size:

Number of constraints, $$6 + 3N*2 + 3(N-1)*2 + 3N + N\sum_{i=1}^{p}(n_i+1)$$

Number of continuous variables,

3N+3N+3(N−1)

Number of discrete variables, $$N\sum_{i=1}^{p} n_i$$

The receding horizon implementation is only slightly different from the fixed time arrival, infinite horizon problem we have considered earlier. One difference is that we no longer expect the vehicle to arrive at the destination at the end of the planning horizon, so the following no longer applies:

$D_B \leq D_A u \leq D_B$

In place of restricting the vehicle to be at the destination at the end of the planning horizon, we encourage the vehicle to get closer to the destination SF by modifying the cost function to include a terminal cost:

$f(x) = r(\|u_1\|_1 + \ldots + \|u_N\|_1) + q(d_1(s_1, s_F) + \ldots + d_1(s(N-1), s_F)) + pd_1(s_N, s_F)$ We can implement the additional term $pd_1(s_N, s_F)$ in the energy function in similar fashion as we did previously. We introduce slack variable $w_N$ such that $\forall k \in \{x, y\}$:

$-w_{jk} \leq s_{jk} - s_{Fk} \leq w_{jk}$ (note: $s_{ix} = x_i$, $s_{iy} = y_i$)

This essentially makes, $\forall k \in \{x, y\}$, $w_{Nk} \geq \|s_{jN} - s_{Fk}\| \geq 0$ By making the cost vector and state vector:

$$c = \begin{bmatrix} 0_{3\times1} \\ \vdots \\ 0_{3\times1} \\ r_{3\times1} \\ \vdots \\ r_{3\times1} \\ q_{3\times1} \\ \vdots \\ q_{3\times1} \\ p_{3\times1} \end{bmatrix} = \begin{bmatrix} 0_{3N\times1} \\ r_{3N\times1} \\ q_{3(N-1)\times1} \\ p_{3\times1} \end{bmatrix}, x = \begin{bmatrix} u_1 \\ \vdots \\ u_N \\ v_1 \\ \vdots \\ v_N \\ w_1 \\ \vdots \\ w_{N-1} \\ w_N \end{bmatrix}$$

We are essentially minimizing $w_{Nk}$ such that $w_{Nk} = \|s_{Nk} - s_{Fk}\|$, or equivalently, $$w_N = \left\| \begin{matrix} x_N - x_F \\ y_N - y_F \\ z_N - z_F \end{matrix} \right\|_1 .$$

To actually implement the above cost function in matrix form, we observe that for the following inequalities:

$-w_{Nk} \leq s_{Nk} - s_{Fk} \leq w_{Nk}$

The equivalent is:

$(s_{Nk} - s_{Fk}) - w_{Nk} \leq 0$ $-(s_{Nk} - s_{Fk}) - w_{Nk} \leq 0$

If we sum up $k: \forall k \in \{x, y\}$, then we have:

$(Ws_N - Ws_F) - w_N \leq 0_{3\times1}$ $-(Ws_N - Ws_F) - w_N \leq 0_{3\times1}$ where $$W = \begin{bmatrix} 1 & 0 & 0 & 0 & 0 & 0 \\ 0 & 1 & 0 & 0 & 0 & 0 \\ 0 & 0 & 1 & 0 & 0 & 0 \end{bmatrix}$$

Since we know:

$$s_k = A^k s_0 + A^{k-1} B u_1 + \ldots + ABu_{k-1} + Bu_k$$

We have, after some rearrangements:

$$(WA^{N-1}Bu_1 + \ldots + WABu_{N-1} + WBu_N) - w_N \leq W(s_F - A^N s_0)$$

$$-(WA^{N-1}Bu_1 + \ldots + WABu_{N-1} + WBu_N) - w_N \leq -W(s_F - A^N s_0)$$

Or in matrix form:

$$[W A^{N-1}B \cdots W AB\ WB] \begin{bmatrix} u_1 \\ \vdots \\ u_N \end{bmatrix} - I^{3\times 3} w_N \leq W(s_F - A^N s_0)$$

$$-[W A^{N-1}B \cdots W AB\ WB] \begin{bmatrix} u_1 \\ \vdots \\ u_N \end{bmatrix} - I^{3\times 3} w_N \leq -W(s_F - A^N s_0)$$

In matrix form, we can augment this with the matrices we have previously:

$$\begin{bmatrix} WB & \cdots & 0 & 0 \\ \vdots & \ddots & 0 & 0 \\ WA^{N-2}B & \cdots & WB & 0 \end{bmatrix} \begin{bmatrix} u_1 \\ \vdots \\ u_N \end{bmatrix} -$$

$$\begin{bmatrix} I^{3\times 3} & & \\ & \ddots & \\ & & I^{3\times 3} \end{bmatrix} \begin{bmatrix} w_1 \\ \vdots \\ w_{N-1} \end{bmatrix} \leq \begin{bmatrix} W(s_F - As_0) \\ \vdots \\ W(s_F - A^{N-1}s_0) \end{bmatrix} -$$

$$\begin{bmatrix} WB & \cdots & 0 & 0 \\ \vdots & \ddots & 0 & 0 \\ WA^{N-2}B & \cdots & WB & 0 \end{bmatrix} \begin{bmatrix} u_1 \\ \vdots \\ u_N \end{bmatrix} - \begin{bmatrix} I^{3\times 3} & & \\ & \ddots & \\ & & I^{3\times 3} \end{bmatrix} \begin{bmatrix} w_1 \\ \vdots \\ w_{N-1} \end{bmatrix} \leq -$$

$$\begin{bmatrix} W(s_F - As_0) \\ \vdots \\ W(s_F - A^{N-1}s_0) \end{bmatrix}$$

So that we have the following instead:

$$\begin{bmatrix} WB & \cdots & 0 \\ \vdots & \ddots & 0 \\ WA^{N-1}B & \cdots & WB \end{bmatrix} \begin{bmatrix} u_1 \\ \vdots \\ u_N \end{bmatrix} - \begin{bmatrix} I^{3\times 3} & & \\ & \ddots & \\ & & I^{3\times 3} \end{bmatrix} \begin{bmatrix} w_1 \\ \vdots \\ w_N \end{bmatrix} \leq$$

$$\begin{bmatrix} W(s_F - As_0) \\ \vdots \\ W(s_F - A^N s_0) \end{bmatrix} -$$

$$\begin{bmatrix} WB & \cdots & 0 \\ \vdots & \ddots & 0 \\ WA^{N-1}B & \cdots & WB \end{bmatrix} \begin{bmatrix} u_1 \\ \vdots \\ u_N \end{bmatrix} - \begin{bmatrix} I^{3\times 3} & & \\ & \ddots & \\ & & I^{3\times 3} \end{bmatrix} \begin{bmatrix} w_1 \\ \vdots \\ w_N \end{bmatrix} \leq -$$

$$\begin{bmatrix} W(s_F - As_0) \\ \vdots \\ W(s_F - A^N s_0) \end{bmatrix}$$

If we define:

$$W'_A = \begin{bmatrix} W_A \\ [W A^{N-1}B \cdots W AB\ WB] \end{bmatrix} = \begin{bmatrix} WB & \cdots & 0 \\ \vdots & \ddots & 0 \\ WA^{N-1}B & \cdots & WB \end{bmatrix}$$

$$W'_B = \begin{bmatrix} W_B \\ W(s_F - A^N s_0) \end{bmatrix} = \begin{bmatrix} W(s_F - As_0) \\ \vdots \\ W(s_F - A^N s_0) \end{bmatrix}$$

$$w' = \begin{bmatrix} w \\ w_N \end{bmatrix} = \begin{bmatrix} w_1 \\ \vdots \\ w_N \end{bmatrix}, \quad x = \begin{bmatrix} u \\ v \\ w' \end{bmatrix}$$

Then the LP problem formulation becomes:

$$\min_x f(x) = \begin{bmatrix} 0_{3N\times 1} \\ r_{3N\times 1} \\ \begin{bmatrix} q_{3(N-1)\times 1} \\ p_{3\times 1} \end{bmatrix} \end{bmatrix}^T \begin{bmatrix} u \\ v \\ w' \end{bmatrix}$$

$$\begin{bmatrix} -\infty_{3N\times 1} \\ -\infty_{3N\times 1} \\ -\infty_{3N\times 1} \\ -\infty_{3N\times 1} \end{bmatrix} \leq \begin{bmatrix} I^{3N\times 3N} & -I^{3N\times 3N} & 0 \\ -I^{3N\times 3N} & -I^{3N\times 3N} & 0 \\ W'_A & 0 & -I^{3N\times 3N} \\ -W'_A & 0 & -I^{3N\times 3N} \end{bmatrix} \begin{bmatrix} u \\ v \\ w' \end{bmatrix} \leq \begin{bmatrix} 0_{3N\times 1} \\ 0_{3N\times 1} \\ W'_B \\ -W'_B \end{bmatrix}$$

$$\begin{bmatrix} -u_{\max[3N\times 1]} \\ -\infty_{3N\times 1} \\ -\infty_{3N\times 1} \end{bmatrix} \leq \begin{bmatrix} u \\ v \\ w' \end{bmatrix} \leq \begin{bmatrix} u_{\max[3N\times 1]} \\ \infty_{3N\times 1} \\ \infty_{3N\times 1} \end{bmatrix}$$

And the MILP problem formulation is:

$$\min_x f(x) = \begin{bmatrix} 0_{3N\times 1} \\ r_{3N\times 1} \\ \begin{bmatrix} q_{3(N-1)\times 1} \\ p_{3\times 1} \end{bmatrix} \\ 0_{Nn_1\times 1} \\ \vdots \\ 0_{Nn_p\times 1} \end{bmatrix}^T \begin{bmatrix} u \\ v \\ w' \\ b_1 \\ \vdots \\ b_p \end{bmatrix}$$

$$\begin{bmatrix} -\infty_{3N\times 1} \\ -\infty_{3N\times 1} \\ -\infty_{3N\times 1} \\ -\infty_{3N\times 1} \\ V_{B_L} \\ -\infty_{Nn_1\times 1} \\ -\infty_{N\times 1} \\ \vdots \\ -\infty_{Nn_p\times 1} \\ -\infty_{N\times 1} \end{bmatrix} \leq \begin{bmatrix} I^{3N\times 3N} & -I^{3N\times 3N} & 0 & 0 & \cdots & 0 \\ -I^{3N\times 3N} & -I^{3N\times 3N} & 0 & 0 & \cdots & 0 \\ W'_A & 0 & -I^{3N\times 3N} & 0 & \cdots & 0 \\ -W'_A & 0 & -I^{3N\times 3N} & 0 & \cdots & 0 \\ V_A & 0 & 0 & 0 & \cdots & 0 \\ \theta^1_{A_1} & 0 & 0 & -MI^{Nn_1\times Nn_1} & & \\ 0 & 0 & 0 & \theta^1_{A_1} & & \\ \vdots & \vdots & \vdots & & \ddots & \\ \theta^p_{A_1} & 0 & 0 & & & -MI^{Nn_1\times Nn_p} \\ 0 & 0 & 0 & & & \theta^p_{A_2} \end{bmatrix}$$

$$\begin{bmatrix} u \\ v \\ w' \\ b_1 \\ \vdots \\ b_p \end{bmatrix} \leq \begin{bmatrix} 0_{3N\times 1} \\ 0_{3N\times 1} \\ W'_B \\ -W'_B \\ V_{B_u} \\ \theta^1_{B_1} \\ (n_1-1)_{N\times 1} \\ \vdots \\ \theta^p_{B_1} \\ (n_p-1)_{N\times 1} \end{bmatrix}$$

$$\begin{bmatrix} -u_{\max[3N\times 1]} \\ -\infty_{3N\times 1} \\ -\infty_{3N\times 1} \\ 0_{Nn_1\times 1} \\ \vdots \\ 0_{Nn_p\times 1} \end{bmatrix} \leq \begin{bmatrix} u \\ v \\ w' \\ b_1 \\ \vdots \\ b_p \end{bmatrix} \leq \begin{bmatrix} u_{\max[3N\times 1]} \\ \infty_{3N\times 1} \\ \infty_{3N\times 1} \\ 1_{Nn_1\times 1} \\ \vdots \\ 1_{Nn_p\times 1} \end{bmatrix}$$

Assuming that N is the number of time steps, the above receding horizon MILP problem has the following size:

Number of constraints, $$3N*2 + 3N*2 + 3N + N\sum_{i=1}^{p}(n_i + 1)$$

Number of continuous variables,

3N+3N+3N

Number of discrete variables, $$N\sum_{i=1}^{p}n_i$$

For Nap-of-the-Earth (NOE) flight, suppose we want to encourage the vehicle to stay closer to the ground. We can do this by imposing a cost on the altitude (z) of the vehicle. This is posed as an additional term in the cost function:

$f(x) = f_{old}(x) + a_z(z_1 + \ldots + z_N)$

If we define:

Z=[0 0 1 0 0 0]

Then $z_k = Zs_k$.

so that:

$a_z(z_1 + \ldots + z_N) = a_z(Zs_1 + \ldots + Zs_N)$

Since we know:

$s_k = A^k s_0 + A^{k-1} B u_1 + \ldots + AB u_{k-1} + B u_k$

To make $z_k = Zs_k$ implementable, we could make $z_k$ slack variables by introducing the following constraint:

$ZA^{k-1}Bu_1 + \ldots + ZABu_{k-1} + ZBu_k - z_k = -ZA^k s_0$

Or in matrix form:

$$[Z\ A^{k-1}B \ldots Z\ AB\ Z\ B]\begin{bmatrix} u_1 \\ \vdots \\ u_k \end{bmatrix} - z_k = -Z\ A^k s_0$$

And the composite form would be:

$$\begin{bmatrix} -ZAs_0 \\ \vdots \\ -ZA^N s_0 \end{bmatrix} \le \begin{bmatrix} ZB & & \\ ZAB & ZB & \\ \vdots & & \ddots \\ ZA^{N-1}B & \cdots & ZAB & ZB \end{bmatrix}$$

$$\begin{bmatrix} u_1 \\ \vdots \\ u_N \end{bmatrix} - \begin{bmatrix} 1 & & \\ & \ddots & \\ & & 1 \end{bmatrix}$$

$$\begin{bmatrix} z_1 \\ \vdots \\ z_N \end{bmatrix} \le \begin{bmatrix} -ZAs_0 \\ \vdots \\ -ZA^N s_0 \end{bmatrix}$$

If we define:

$$Z_A = \begin{bmatrix} ZB & & \\ ZAB & ZB & \\ \vdots & & \ddots \\ ZA^{N-1}B & \cdots & ZAB & ZB \end{bmatrix},$$

$$Z_B = \begin{bmatrix} -ZAs_0 \\ \vdots \\ -ZA^N s_0 \end{bmatrix},$$

$$z = \begin{bmatrix} z_1 \\ \vdots \\ z_N \end{bmatrix}$$

Then we have:

$Z_B \le Z_A u - I^{N \times N} z \le Z_B$

We can add this to the existing matrices in the RH problem formulation to yield:

$$\min_x f(x) = \begin{bmatrix} 0_{3N \times 1} \\ r_{3N \times 1} \\ \begin{bmatrix} q_{3(N-1) \times 1} \\ p_{3 \times 1} \end{bmatrix} \\ a_{z[N \times 1]} \\ 0_{Nn_1 \times 1} \\ \vdots \\ 0_{Nn_p \times 1} \end{bmatrix}^T \begin{bmatrix} u \\ v \\ w' \\ z \\ b_1 \\ \vdots \\ b_p \end{bmatrix}$$

-continued $$\begin{bmatrix} -\infty_{3N\times 1} \\ -\infty_{3N\times 1} \\ -\infty_{3N\times 1} \\ -\infty_{3N\times 1} \\ V_{B_L} \\ Z_B \\ -\infty_{Nn_1\times 1} \\ -\infty_{N\times 1} \\ \vdots \\ -\infty_{Nn_p\times 1} \\ -\infty_{N\times 1} \end{bmatrix} \le \begin{bmatrix} I^{3N\times 3N} & -I^{3N\times 3N} & 0 & 0 & 0 & \cdots & 0 \\ -I^{3N\times 3N} & -I^{3N\times 3N} & 0 & 0 & 0 & \cdots & 0 \\ W'_A & 0 & -I^{3N\times 3N} & 0 & 0 & \cdots & 0 \\ -W'_A & 0 & -I^{3N\times 3N} & 0 & 0 & \cdots & 0 \\ V_A & 0 & 0 & 0 & 0 & \cdots & 0 \\ Z_A & 0 & 0 & -I^{N\times N} & 0 & \cdots & 0 \\ \theta^1_{A_1} & 0 & 0 & 0 & -MI^{Nn_1} & & \\ 0 & 0 & 0 & 0 & \theta^1_{A_2} & & \\ \vdots & \vdots & \vdots & \vdots & & \ddots & \\ \theta^p_{A_1} & 0 & 0 & 0 & & & -MI^{Nn_p} \\ 0 & 0 & 0 & 0 & & & \theta^p_{A_2} \end{bmatrix}$$

$$\begin{bmatrix} u \\ v \\ w' \\ z \\ b_1 \\ \vdots \\ b_p \end{bmatrix} \le \begin{bmatrix} 0_{3N\times 1} \\ 0_{3N\times 1} \\ W'_B \\ -W'_B \\ V_{B_u} \\ Z_B \\ \theta^1_{B_1} \\ (n_1-1)_{N\times 1} \\ \vdots \\ \theta^p_{B_1} \\ (n_p-1)_{N\times 1} \end{bmatrix}$$

$$\begin{bmatrix} -u_{\max[3N\times 1]} \\ -\infty_{3N\times 1} \\ -\infty_{3N\times 1} \\ -\infty_{N\times 1} \\ 0_{Nn_1\times 1} \\ \vdots \\ 0_{Nn_p\times 1} \end{bmatrix} \le \begin{bmatrix} u \\ v \\ w' \\ z \\ b_1 \\ \vdots \\ b_p \end{bmatrix} \le \begin{bmatrix} u_{\max[3N\times 1]} \\ \infty_{3N\times 1} \\ \infty_{3N\times 1} \\ \infty_{N\times 1} \\ 1_{Nn_1\times 1} \\ \vdots \\ 1_{Nn_p\times 1} \end{bmatrix}$$

Alternately, if we introduced the NOE constraints to the non-RH formulation, we would have:

$$\min_x f(x) = \begin{bmatrix} 0_{3N\times 1} \\ r_{3N\times 1} \\ q_{3(N-1)\times 1} \\ a_{d[N\times 1]} \\ 0_{Nn_1\times 1} \\ \vdots \\ 0_{Nn_p\times 1} \end{bmatrix}^T \begin{bmatrix} u \\ v \\ w \\ z \\ b_1 \\ \vdots \\ b_p \end{bmatrix}$$

$$\begin{bmatrix} D_B \\ -\infty_{3N\times 1} \\ -\infty_{3N\times 1} \\ -\infty_{3(N-1)\times 1} \\ -\infty_{3(N-1)\times 1} \\ V_{B_L} \\ Z_B \\ -\infty_{Nn_1\times 1} \\ -\infty_{N\times 1} \\ \vdots \\ -\infty_{Nn_p\times 1} \\ -\infty_{N\times 1} \end{bmatrix} \leq \begin{bmatrix} D_A & 0 & 0 & 0 & 0 & \cdots & 0 \\ I^{3N\times 3N} & -I^{3N\times 3N} & 0 & 0 & 0 & \cdots & 0 \\ -I^{3N\times 3N} & -I^{3N\times 3N} & 0 & 0 & 0 & \cdots & 0 \\ W_A & 0 & -I^{3(N-1)} & 0 & 0 & \cdots & 0 \\ -W_A & 0 & -I^{3(N-1)} & 0 & 0 & \cdots & 0 \\ V_A & 0 & 0 & 0 & 0 & \cdots & 0 \\ Z_A & 0 & 0 & -I^{N\times N} & 0 & \cdots & 0 \\ \theta_{A_1}^1 & 0 & 0 & 0 & -MI^{Nn_1} & & \\ 0 & 0 & 0 & 0 & \theta_{A_2}^1 & & \\ \vdots & \vdots & \vdots & \vdots & & \ddots & \\ \theta_{A_1}^p & 0 & 0 & 0 & & & -MI^{Nn_p} \\ 0 & 0 & 0 & 0 & & & \theta_{A_2}^p \end{bmatrix}$$

$$\begin{bmatrix} u \\ v \\ w \\ z \\ b_1 \\ \vdots \\ b_p \end{bmatrix} \leq \begin{bmatrix} D_B \\ 0_{3N\times 1} \\ 0_{3N\times 1} \\ W_B \\ -W_B \\ V_{B_u} \\ Z_B \\ \theta_{B_1}^1 \\ (n_1-1)_{N\times 1} \\ \vdots \\ \theta_{B_1}^p \\ (n_p-1)_{N\times 1} \end{bmatrix}$$

$$\begin{bmatrix} -u_{\max[3N\times 1]} \\ -\infty_{3N\times 1} \\ -\infty_{3(N-1)\times 1} \\ -\infty_{N\times 1} \\ 0_{Nn_1\times 1} \\ \vdots \\ 0_{Nn_p\times 1} \end{bmatrix} \leq \begin{bmatrix} u \\ v \\ w \\ z \\ b_1 \\ \vdots \\ b_p \end{bmatrix} \leq \begin{bmatrix} u_{\max[3N\times 1]} \\ \infty_{3N\times 1} \\ \infty_{3(N-1)\times 1} \\ \infty_{N\times 1} \\ 1_{Nn_1\times 1} \\ \vdots \\ 1_{Nn_p\times 1} \end{bmatrix}$$

Assuming that N is the number of time steps, the above receding horizon MILP problem has the following size:

Number of constraints, $$3N*2 + 3N*2 + 3N + N + N\sum_{i=1}^{P}(n_i + 1)$$

Number of continuous variables,

3N+3N+3N+N

Number of discrete variables, $$N\sum_{i=1}^{P} n_i$$

Alternately, if we introduced the NOE constraints to the non-RH formulation, the problem size would be:

Number of constraints, $$6 + 3N*2 + 3(N-1)*2 + 3N + N + N\sum_{i=1}^{P}(n_i + 1)$$

Number of continuous variables,

3N+3N+3(N−1)+N

Number of discrete variables, $$N\sum_{i=1}^{P} n_i$$

We have presented various problem formulations in MILP. One implicit assumption was that there will be a solution to each of these problems. However, this is not always the case. In fact, with very simple manipulations of the constraints, we can easily show that no solution exists for these modified problems. For instance, for any fixed-horizon MILP problems which require that the vehicle starts and ends in particular states, we can easily show that no solution exists by severely limiting the maximum speed and/or acceleration available to the vehicle. Similarly, for any receding-horizon MILP problem, we can allow the vehicle to travel at high speeds, but with very limited acceleration/deceleration rate and very limited time horizon such that it is possible for the vehicle to "see" an obstacle in the problem formulation, but it is mathematically unable to avoid colliding with it. In both of these cases a solution which satisfies all of the constraints imposed by the particular problem formulation does not exist. In the first case, any proposed solution that satisfies the speed and acceleration constraints will not arrive at the destination at the prescribed time. In the second, any proposed solution that satisfies the speed and acceleration constraints will not satisfy the collision constraints, and vice versa. As for the former scenario, one can only call the problem an illconditioned one because we are asking the vehicle to achieve the impossible.

This can be resolved only by redefining the constraints of the problem to more realistic values. The latter scenario is the motivation for safe maneuvers. The danger posed by this scenario is very much real if we were to implement MILP trajectory planning in a realistic environment. Therefore, it is desirable to introduce a mechanism in the solution process to ensure that this scenario will not manifest itself. Since the vehicle model is that of a double integrator in each axis, one way to ensure that the vehicle will not run into any obstacle is by properly scaling the maximum vehicle velocity (vmax), maximum vehicle acceleration (umax), and look-ahead time horizon (N) such that, in the worst case scenario, a solution theoretically should still exist, although the solution could involve temporarily or permanently stopping behind the subject obstacle. This is easily achieved by imposing the following constraint on the vehicle dynamics:

$$v_{max} \leq N \times u_{max}$$

which ensures that the vehicle will come to a stop in the same number of time steps as the planning horizon.

Failing that, we could yet have another scenario where a solution (whether optimal or not) theoretically exists but the MILP problem is so large that any valid solution (even a suboptimal one) would take an unrealistic amount of time for the solver to find a solution in the context of real-time vehicle control. From a viewpoint of guaranteed safety, assuming that we have proper obstacle detection and adhere to the stated maximum velocity limit and have the stated deceleration capability, whenever the solver fails to return a valid solution within a specified time appropriate in a real-time environment, we can force the vehicle to a stop. The vehicle speed restriction, which is tied to the maximum deceleration rate and planning horizon, still applies here. This mechanism works in practice because almost all MILP solvers have a time-out value a user can set, beyond which the solver will either display the best solution it has found prior to the time-out, or indicate that no valid suboptimal solution has been found.

We intend to generate a trajectory through a 3-D space with obstacles, throughout which the vehicle does not fall within line-of-sight of ground threats, whose positions are known. An example would be a downtown area, where numerous buildings serve as obstructions to line-of-sight to the threats.

If line-of-sight visibility to a known threat is to be completely avoided throughout the entire planned trajectory, we can define all spaces that are visible to a threat similar to obstacles that are to be avoided, so that the planned trajectory will not intersect these spaces. This would allow us to use our existing MILP problem formulation. However, for a typical 3-D case, it is often easier to consider the problem in reverse. That is, instead of defining obstacle-like unsafe zones where the trajectory needs to avoid, we introduce the concept of safe zones within which one cannot be seen by a threat. We formally define such a safe zone as a space associated with one threat and one obstacle, within which one is not visible to the threat. Geometrically, each safe zone will be bounded by the sides of an obstacle that are facing the threat, as well as planes that intersect both the threat (a point) and the edges of these aforementioned sides. FIG. 3 illustrates this in 2-D. Notice that a corresponding safe zone in 3-D for a cube would be a pyramid of infinite height, minus a smaller pyramid with the "front face" of the cube as its base and sharing the same top.

Figure 12:
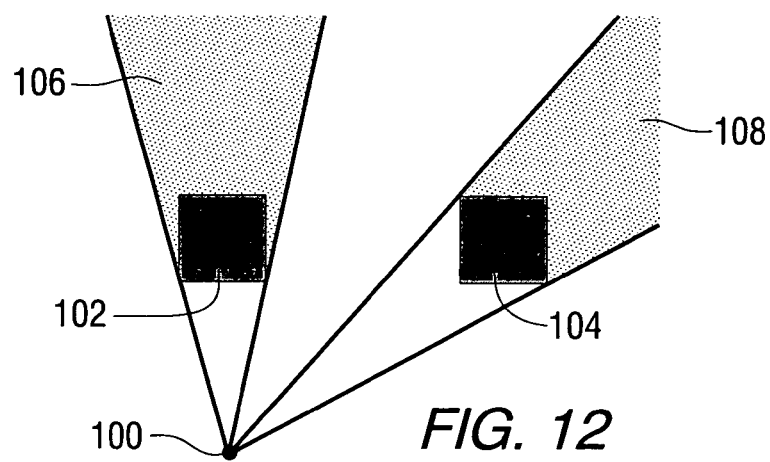
FIG. 12 is a schematic representation of safe zones.

Fundamentally, safe zones are geometrically easier to define and implement in an MILP algorithm than unsafe zones for several reasons. First, the safe zone for a single threat, single obstacle scenario is simply the "shadow" cast by the obstacle under the threat and is thus straightforward to define for convex obstacles. Second, in a single threat, multiple obstacles scenario, the set of spaces invisible to the threat, or overall safe zone, is simply a union of all the safe zones associated with each obstacle. FIG. 12 shows what the space looks like. In FIG. 12, a threat is located at point 100. Obstacles 102 and 104 block the line-of-sight direction from the threat to create safe zones 106 and 108. This holds true even if one obstacle partially or totally blocks another obstacle from view of the threat, because if one is inside one of the "shadows" one is safe whether or not one is in another obstacle's "shadow". FIG. 4 shows why this is true. Unsafe zones, on the other hand, do not have similar "nice" properties. FIG. 5 shows the overall safe zone for a single threat, multiple obstacles scenario. Third, if we have multiple threats and multiple obstacles, the overall safe zone is defined as the intersection of sets of safe zones, with each set corresponding to a threat.

To paint a more mathematical picture of what we just described, we make use of notations from point-set topology. Suppose we have t threats and o obstacles. We would have t×o number of safe zones, with each one associated with a single threat and a single obstacle. Each safe zone is likened to a "shadow" behind an obstacle cast by a threat. Let's label a safe zone with subscript and superscript as in $$S_j^i,$$

where $$i \in \{1, \ldots, o\}$$

denotes the obstacle and $$j \in \{1, \ldots, t\}$$

denotes the threat.

The overall safe zone would be the following:

$$(S_1^1 \cup \ldots \cup S_1^o) \cup \ldots \cup (S_t^1 \cup \ldots \cup S_t^o)$$

We assume that each obstacle is defined by a finite number of planar inequalities, so that the safe zone associated with each obstacle and a threat is also defined by a finite number of planar inequalities. Suppose we have a rectangular box in 3-D defined by:

$$x_{min} \leq x \leq x_{max}$$

$$y_{min} \leq y \leq y_{max}$$

$$z_{min} \leq z \leq z_{max}$$

We introduce binary variables $$b_{k_*} \in \{0,1\}$$

for each time step k and a number M>>0 sufficiently large such that:

$$-x - Mb_{k_{x_{min}}} \leq -x_{min}$$

$$-y - Mb_{k_{y_{min}}} \leq -y_{min}$$

$$-z - Mb_{k_{z_{min}}} \leq -z_{min}$$

$$x - Mb_{k_{x_{max}}} \leq x_{max}$$

$$y - Mb_{k_{y_{max}}} \leq y_{max}$$

$$z - Mb_{k_{z_{max}}} \leq z_{max}$$

$$b_{k_{x_{min}}} + b_{k_{y_{min}}} + b_{k_{z_{min}}} + b_{k_{x_{max}}} + b_{k_{y_{max}}} + b_{k_{z_{max}}} - Mb_k^{box} \leq 0$$

First we show that $$b_k^{box} = 0$$

implies (x, y, z) is inside the box at time k:

$$b_k^{box} = 0 \Rightarrow k_{x_{min}} = b_{k_{y_{min}}} = b_{k_{z_{min}}} = b_{k_{x_{max}}} = b_{k_{y_{max}}} = b_{k_{max}} = 0$$

$$\Rightarrow -x \leq -x_{min}, x \leq x_{max}$$

$$\Rightarrow x_{min} \leq x \leq x_{max} - y \leq -y_{min}, y \leq y_{max}$$

$$\Rightarrow y_{min} \leq y \leq y_{max} - z \leq -z_{min}, z \leq z_{max}$$

$$\Rightarrow z_{min} \leq z \leq z_{max}$$

Now, instead of restricting the safe zone to a rectangular box, we generalize the above constraints to include 3-D spaces defined by planar (but not necessarily Euclidean) constraints, through the use of auxiliary matrices and variables as introduced above. Suppose we have a safe zone defined by s planar constraints, or sides, we have the following constraints:

$$-\theta_1 s_k - Mb_{k_1} \leq -\theta'_1$$

$$\vdots$$

$$-\theta_s s_k - Mb_{k_s} \leq -\theta'_s$$

$$b_{k_1} + \ldots + b_{k_s} - Mb'_k \leq 0$$

If we set:

$$\theta = \begin{bmatrix} \theta_1 \\ \vdots \\ \theta_s \end{bmatrix}, b_k = \begin{bmatrix} b_{k_1} \\ \vdots \\ b_{k_s} \end{bmatrix}, \theta' = \begin{bmatrix} \theta'_1 \\ \vdots \\ \theta'_s \end{bmatrix}$$

The above inequalities become:

$$-\theta s_k - Mb_k \leq -\theta'$$

$$b_{k_1} + \ldots + b_{k_s} - Mb'_k \leq 0$$

If we sum up the above inequalities for all $$k \in \{1, \ldots, N\},$$

and following similar simplification steps as those shown above, we have the following:

$$-\begin{bmatrix} \theta B & 0 & \cdots & 0 \\ \theta AB & \theta B & \ddots & \vdots \\ \vdots & & \ddots & 0 \\ \theta A^{N-1}B & \cdots & \theta AB & \theta B \end{bmatrix} \begin{bmatrix} u_1 \\ \vdots \\ u_N \end{bmatrix} + \begin{bmatrix} -MI^{s \times s} & 0 & \cdots & 0 \\ 0 & \ddots & \ddots & \vdots \\ \vdots & \ddots & \ddots & 0 \\ 0 & \cdots & 0 & -MI^{s \times s} \end{bmatrix}$$

-continued $$\begin{bmatrix} b_1 \\ \vdots \\ b_N \end{bmatrix} \leq - \begin{bmatrix} \theta' - \theta As_0 \\ \vdots \\ \theta' - \theta A^N s_0 \end{bmatrix}$$

$$\begin{bmatrix} [1\cdots 1]_{[1\times s]} & 0 & \cdots & 0 \\ 0 & \ddots & \ddots & \vdots \\ \vdots & \ddots & \ddots & 0 \\ 0 & \cdots & 0 & [1\cdots 1]_{[1\times s]} \end{bmatrix} \begin{bmatrix} b_1 \\ \vdots \\ b_N \end{bmatrix} + \begin{bmatrix} -M & 0 & 0 \\ 0 & \ddots & 0 \\ 0 & 0 & -M \end{bmatrix}$$

$$\begin{bmatrix} b'_1 \\ \vdots \\ b'_N \end{bmatrix} \leq \begin{bmatrix} 0 \\ \vdots \\ 0 \end{bmatrix}$$

If we define:

$$T_{A_1} = \begin{bmatrix} \theta B & 0 & \cdots & 0 \\ \theta AB & \theta B & \ddots & \vdots \\ \vdots & & \ddots & 0 \\ \theta A^{N-1}B & \cdots & \theta AB & \theta B \end{bmatrix}, T_{B_1} = - \begin{bmatrix} \theta' - \theta As_0 \\ \vdots \\ \theta' - \theta A^N s_0 \end{bmatrix}$$

$$b_T = \begin{bmatrix} b_1 \\ \vdots \\ b_N \end{bmatrix} b'_T = \begin{bmatrix} b'_1 \\ \vdots \\ b'_N \end{bmatrix}$$

$$T_{A_2} = \begin{bmatrix} [1\cdots 1]_{[1\times s]} & 0 & \cdots & 0 \\ 0 & \ddots & \ddots & \vdots \\ \vdots & \ddots & \ddots & 0 \\ 0 & \cdots & 0 & [1\cdots 1]_{[1\times s]} \end{bmatrix}$$

Then the constraints become:

$$-\infty_{[Ns\times 1]} \leq T_{A_1} u - MI^{Ns\times Ns} b_T \leq T_{B_1}$$

$$-\infty_{[N\times 1]} \leq T_{A_2} b_T - MI^{N\times N} b'_T \leq 0_{[N\times 1]}$$

As usual, $b'_k = 0$ implies that the trajectory is inside the safe zone defined by the obstacle auxiliary matrix and variable $(\theta, \theta')$ at time k. Now, suppose we have one safe zone defined for each obstacle $$i \in \{1, \ldots, o\},$$

and for each threat $$j \in \{1, \ldots, t\}.$$

$$-\infty_{[Ns_j\times 1]} \leq T_{A_1}^{i,j} u - MI^{Ns_j\times Ns_i} b_T^{i,j} \leq T_{B_i}^{i,j}$$

$$-\infty_{[N\times 1]} \leq T_{A_2}^{i,j} - MI^{N\times N} b'_T^{i,j} \leq 0_{[N\times 1]}$$

We have the following constraint $$\forall j \in \{1, \ldots, t\}, \forall k \in \{1, \ldots, N\}:$$

$$b'^{1,j}_k + \ldots + b'^{o,j}_k \leq o-1$$

The above constraint guarantees that at least one member of the set $$\{b'^{1,j}_k, \ldots, b'^{o,j}_k\}$$

is zero. That is, at time k, the trajectory is hidden from view from threat j behind at least one obstacle. Taken collectively for all threats j and time steps k, the trajectory is hidden from view behind some obstacle(s) from every threat at every time step.

We can express the following:

$$-\infty_{[Ns_j\times 1]} \leq T_{A_1}^{i,j} u - MI^{Ns_j\times Ns_i} b_T^{i,j} \leq T_{B_i}^{i,j}$$

$$-\infty_{[N\times 1]} \leq T_{A_2}^{i,j} b_T^{i,j} - MI^{N\times N} b'_T^{i,j} \leq 0_{[N\times 1]}$$

in matrix form for all $$i \in \{1, \ldots, o\}, j \in \{1, \ldots, t\},$$

then we have:

$$\begin{bmatrix} T_{A_1}^{1,1} \\ \vdots \\ T_{A_1}^{o,1} \\ \vdots \\ T_{A_1}^{1,t} \\ \vdots \\ T_{A_1}^{o,t} \end{bmatrix} u + \begin{bmatrix} -MI^{Ns_1} & & & & \\ & \ddots & & & \\ & & -MI^{Ns_o} & & \\ & & & \ddots & \\ & & & & -MI^{Ns_1} \\ & & & & & \ddots \\ & & & & & & -MI^{Ns_o} \end{bmatrix}$$

$$\begin{bmatrix} b_T^{1,1} \\ \vdots \\ b_T^{o,1} \\ \vdots \\ b_T^{1,t} \\ \vdots \\ b_T^{o,t} \end{bmatrix} \leq \begin{bmatrix} T_{B_1}^{1,1} \\ \vdots \\ T_{B_1}^{o,1} \\ \vdots \\ T_{B_1}^{1,t} \\ \vdots \\ T_{B_1}^{o,t} \end{bmatrix} \begin{bmatrix} T_{A_2}^{1,1} & & & & \\ & \ddots & & & \\ & & T_{A_2}^{o,1} & & \\ & & & \ddots & \\ & & & & T_{A_2}^{1,t} \\ & & & & & \ddots \\ & & & & & & T_{A_2}^{o,t} \end{bmatrix}$$

$$\begin{bmatrix} b_T^{1,1} \\ \vdots \\ b_T^{o,1} \\ \vdots \\ b_T^{1,t} \\ \vdots \\ b_T^{o,t} \end{bmatrix} + \begin{bmatrix} -MI^N & & & & \\ & \ddots & & & \\ & & -MI^N & & \\ & & & \ddots & \\ & & & & -MI^N \\ & & & & & \ddots \\ & & & & & & -MI^N \end{bmatrix}$$

$$\begin{bmatrix} b'^{1,1}_T \\ \vdots \\ b'^{o,1}_T \\ \vdots \\ b'^{1,t}_T \\ \vdots \\ b'^{o,t}_T \end{bmatrix} \leq 0_{Not\times 1}$$

If we express the following:

$$b'^{1,j}_k + \ldots + b'^{o,j}_k \leq o-1$$

in matrix form for all $$j \in \{1, \ldots, t\}, k \in \{1, \ldots, N\},$$

we first notice that:

$$\begin{bmatrix} b_1'^{1,j} \\ \vdots \\ b_N'^{1,j} \end{bmatrix} + \ldots + \begin{bmatrix} b_1'^{o,j} \\ \vdots \\ b_N'^{o,j} \end{bmatrix} = b_T'^{1,j} + \ldots + b_T'^{o,j} \le (o-1)_{N \times 1}$$

so that for all $$j \in \{1, \ldots, t\},$$

we have:

$$[I^{N \times N} \ldots I^{N \times N}] \begin{bmatrix} b_T'^{1,j} \\ \vdots \\ b_T'^{o,j} \end{bmatrix} \le (o-1)_{N \times 1}$$

Finally, by summing up all $$j \in \{1, \ldots, t\},$$

we have:

$$\begin{bmatrix} [I^{N \times N} \ldots I^{N \times N}]_{N \times No} & & \\ & \ddots & \\ & & [I^{N \times N} \ldots I^{N \times N}]_{N \times No} \end{bmatrix}_{Nt \times Not}$$

$$\begin{bmatrix} b_T'^{1,1} \\ \vdots \\ b_T'^{o,1} \\ \vdots \\ b_T'^{1,t} \\ \vdots \\ b_T'^{o,t} \end{bmatrix} \le (o-1)_{Nt \times 1}$$

If we define:

$$T_{A1} = \begin{bmatrix} T_{A_1}^{1,1} \\ \vdots \\ T_{A_1}^{o,1} \\ \vdots \\ T_{A_1}^{1,t} \\ \vdots \\ T_{A_1}^{o,t} \end{bmatrix}, T_{A2} = \begin{bmatrix} T_{A_2}^{1,1} & & & \\ & T_{A_2}^{o,1} & & \\ & & \ddots & \\ & & & T_{A_2}^{1,t} \\ & & & & \ddots \\ & & & & & T_{A_2}^{o,t} \end{bmatrix}$$

$$T_{A3} = \begin{bmatrix} [I^{N \times N} \ldots I^{N \times N}]_{N \times No} & & \\ & \ddots & \\ & & [I^{N \times N} \ldots I^{N \times N}]_{N \times No} \end{bmatrix}_{Nt \times Not}$$

$$T_{B1} = \begin{bmatrix} T_{B_1}^{1,1} \\ \vdots \\ T_{B_1}^{o,1} \\ \vdots \\ T_{B_1}^{1,t} \\ \vdots \\ T_{B_1}^{o,t} \end{bmatrix}, x_{T1} = \begin{bmatrix} b_T^{1,1} \\ \vdots \\ b_T^{o,1} \\ \vdots \\ b_T^{1,t} \\ \vdots \\ b_T^{o,t} \end{bmatrix}, x_{T2} = \begin{bmatrix} b_T'^{1,1} \\ \vdots \\ b_T'^{o,1} \\ \vdots \\ b_T'^{1,t} \\ \vdots \\ b_T'^{o,t} \end{bmatrix}$$

then we have:

$$\begin{bmatrix} -\infty_{Nt(s_1+\ldots+s_o) \times 1} \\ -\infty_{Not \times 1} \\ -\infty_{Nt \times 1} \end{bmatrix} \le \begin{bmatrix} T_{A1} & -MI^{Nt(s_1+\ldots+s_o)} & 0 \\ 0 & T_{A2} & -MI^{Not} \\ 0 & 0 & T_{A3} \end{bmatrix}$$

$$\begin{bmatrix} u \\ x_{T1} \\ x_{T2} \end{bmatrix} \le \begin{bmatrix} T_{B1} \\ 0_{Not \times 1} \\ (o-1)_{Nt \times 1} \end{bmatrix}$$

and if we augment our new threat visibility constraints to our existing MILP problem formulation, expressed in symbolic form as:

$$\min_x f(x) = c^T x$$

$$b_L \le Ax \le b_U$$

$$x_L \le x \le x_U$$

then we have:

$$\min_x f(x) = \begin{bmatrix} c \\ 0_{Nt(s_1+\ldots+s_o) \times 1} \\ 0_{Not \times 1} \end{bmatrix}^T \begin{bmatrix} x \\ x_{T1} \\ x_{T2} \end{bmatrix}$$

$$\begin{bmatrix} b_L \\ -\infty_{Nt(s_1+\ldots+s_o) \times 1} \\ -\infty_{Not \times 1} \\ -\infty_{Nt \times 1} \end{bmatrix} \le \begin{bmatrix} A & 0 & 0 \\ [T_{A1} 0] & -MI^{Nt(s_1+\ldots+s_o)} & 0 \\ 0 & T_{A2} & -MI^{Not} \\ 0 & 0 & T_{A3} \end{bmatrix}$$

$$\begin{bmatrix} x \\ x_{T1} \\ x_{T2} \end{bmatrix} \le \begin{bmatrix} b_U \\ T_{B1} \\ 0_{Not \times 1} \\ (o-1)_{Nt \times 1} \end{bmatrix} \begin{bmatrix} x_L \\ 0_{Nt(s_1+\ldots+s_o) \times 1} \\ 0_{Not \times 1} \end{bmatrix} \le \begin{bmatrix} x \\ x_{T1} \\ x_{T2} \end{bmatrix} \le \begin{bmatrix} x_U \\ 1_{Nt(s_1+\ldots+s_o) \times 1} \\ 1_{Not \times 1} \end{bmatrix}$$

The disadvantage of the absolute threat visibility approach is that many problems with reasonably minimal (but not zero) visibility exposure to threats will be left out and some problems may have no solution as a result. A solution to this limitation is to construct a set of relative threat visibility constraints, where a vehicle is encouraged but not required to stay out of areas visible by threats, so that the resulting trajectory is the best balance between threat visibility, time, energy, and/or other optimality criteria:

As shown above, we have the following constraints for each combination of obstacle and threat $$-\infty_{[Ns_i \times 1]} \leq T_{A_1}^{i,j} u - MI^{Ns_i \times Ns_i} b_T^{i,j} \leq T_{B_1}^{i,j}$$

$$-\infty_{[N \times 1]} \leq T_{A_2}^{i,j} b_T^{i,j} - MI^{N \times N} b'_T^{i,j} \leq 0_{[N \times 1]}$$

and we have the following constraint to guarantee no visibility to any threat j at time k:

$$b'_k{}^{1,j} + \ldots + b'_k{}^{o,j} \leq o-1$$

If we modify the above constraint to the following:

$$b'_k{}^{1,j} + \ldots + b'_k{}^{o,j} - M b_k^j \leq o-1$$

Then following the same argument used previously for the original constraint, we can show that $$b_k^j = 0$$

implies that the trajectory is invisible to threat j at time k. Although $$b_k^j = 1$$

does not imply that the trajectory is either visible or invisible from the threat, if we combine the above constraint with the following new cost function with $a_t > 0$:

$$f(x) = f_{old}(x) + a_t(b_1^1 + \ldots + b_1^t + \ldots + b_N^1 + \ldots + b_N^t)$$

Then we are associating a positive cost to any $$b_k^j$$

being 1, so that if the trajectory at time k is truly invisible to threat j, the solver would favor $$b_k^j = 0$$

over $$b_k^j = 1$$

as a solution which achieves a lower cost with everything else being the same. Thus it is safe to say that $$b_k^j = 1$$

implies that the trajectory is visible to threat j at time k. Therefore, with the modified cost function, we are essentially associating a positive cost to being visible to each threat, for each time step, and has the overall effect of encouraging the trajectory to remain invisible from threats for as long as practical.

To summarize our relative threat visibility constraints, we first express the following modified constraint for all $k \in \{1, \ldots, N\}$:

$$b'_k{}^{1,j} + \ldots + b'_k{}^{o,j} - M b_k^j \leq o-1$$

and define:

$$b_T^j = \begin{bmatrix} b_1^j \\ \vdots \\ b_N^j \end{bmatrix}$$

and get:

$$\begin{bmatrix} b_1'^{1,j} \\ \vdots \\ b_N'^{1,j} \end{bmatrix} + \ldots + \begin{bmatrix} b_1'^{o,j} \\ \vdots \\ b_N'^{o,j} \end{bmatrix} - M \begin{bmatrix} b_1^j \\ \vdots \\ b_N^j \end{bmatrix} = b_T'^{1,j} + \ldots + b_T'^{o,j} - M b_T^j \leq (o-1)_{N \times 1}$$

so that for all $$j \in \{1, \ldots, t\},$$

we have:

$$[I^{N \times N} \cdots I^{N \times N}] \begin{bmatrix} b_T'^{1,j} \\ \vdots \\ b_T'^{o,j} \end{bmatrix} - MI^{N \times N} b_T^j \leq (o-1)_{N \times 1}$$

Finally, we have:

$$\begin{bmatrix} [I^{N \times N} \cdots I^{N \times N}]_{N \times No} & & \\ & \ddots & \\ & & [I^{N \times N} \cdots I^{N \times N}]_{N \times No} \end{bmatrix}_{Nt \times Not}$$

$$\begin{bmatrix} b_T'^{1,1} \\ \vdots \\ b_T'^{o,1} \\ \vdots \\ b_T'^{1,t} \\ \vdots \\ b_T'^{o,t} \end{bmatrix} - MI^{Nt \times Nt} \begin{bmatrix} b_T^1 \\ \vdots \\ b_T^t \end{bmatrix} \leq (o-1)_{Nt \times 1}$$

If we define:

$$x_{T3} = \begin{bmatrix} b_T^1 \\ \vdots \\ b_T^t \end{bmatrix}$$

and assume the previous definitions for $$T_{A1}, T_{A2}, T_{A3}, T_{B1}, x_{T1}, \text{ and } x_{T2}$$

we have made in the previous section, then our relative threat visibility constraints would have the form:

$$\begin{bmatrix} -\infty_{Nt(s_1 + \ldots + s_o) \times 1} \\ -\infty_{Not \times 1} \\ -\infty_{Nt \times 1} \end{bmatrix} \leq$$

-continued $$\begin{bmatrix} T_{A1} & -MI^{Nt(s_1+\ldots+s_o)} & 0 & 0 \\ 0 & T_{A2} & -MI^{Not} & 0 \\ 0 & 0 & T_{A3} & -MI^{Nt\times Nt} \end{bmatrix}$$

$$\begin{bmatrix} u \\ x_{T1} \\ x_{T2} \\ x_{T3} \end{bmatrix} \leq \begin{bmatrix} T_{B1} \\ 0_{Not\times 1} \\ (o-1)_{Nt\times 1} \end{bmatrix}$$

and if we augment our new threat visibility constraints to our existing MILP problem formulation, expressed in symbolic form as:

$$\min_x f(x) = c^T x$$
$$b_L \leq Ax \leq b_U$$
$$x_L \leq x \leq x_U$$

then we have:

$$\min_x f(x) = \begin{bmatrix} c \\ 0_{Nt(s_1+\ldots+s_o)\times 1} \\ 0_{Not\times 1} \\ a_{t[Nt\times 1]} \end{bmatrix}^T \begin{bmatrix} x \\ x_{T1} \\ x_{T2} \\ x_{T3} \end{bmatrix}$$

$$\begin{bmatrix} b_L \\ -\infty_{Nt(s_1+\ldots+s_o)\times 1} \\ -\infty_{Not\times 1} \\ -\infty_{Nt\times 1} \end{bmatrix} \leq$$

$$\begin{bmatrix} A & 0 & 0 & 0 \\ [T_{A1}\,0] & -MI^{Nt(s_1+\ldots+s_o)} & 0 & 0 \\ 0 & T_{A2} & -MI^{Not} & 0 \\ 0 & 0 & T_{A3} & -MI^{Nt\times Nt} \end{bmatrix}$$

$$\begin{bmatrix} x \\ x_{T1} \\ x_{T2} \\ x_{T3} \end{bmatrix} \leq \begin{bmatrix} b_U \\ T_{B1} \\ 0_{Not\times 1} \\ (o-1)_{Nt\times 1} \end{bmatrix} \begin{bmatrix} x_L \\ 0_{Nt(s_1+\ldots+s_o)\times 1} \\ 0_{Not\times 1} \\ 0_{Nt\times 1} \end{bmatrix} \leq \begin{bmatrix} x \\ x_{T1} \\ x_{T2} \\ x_{T3} \end{bmatrix} \leq \begin{bmatrix} x_U \\ 1_{Nt(s_1+\ldots+s_o)\times 1} \\ 1_{Not\times 1} \\ 1_{Nt\times 1} \end{bmatrix}$$

Suppose we wish to generate an optimal trajectory that allows a vehicle to see a number of surveillance targets (not necessarily at the same time), i.e. for bomb damage assessment in an urban environment. In other words, we require that, for each surveillance target, the vehicle must visit at least one location from which the target is within line-of-sight of the vehicle. We recall from the previous section that in terms of visibility from threats, safe zones are easier to implement than unsafe zones. Therefore, if we consider the surveillance targets as threats, and safe (or unsafe) zones as locations from which one cannot (or can) see the target, in order to conduct such a surveillance mission, for each threat, one has to be outside all of the safe zones associated with that threat for at least one time step in the planned trajectory. Now, because our solution requires the trajectory to be outside of safe zones, we adopt the basic problem formulations we have established for obstacles as considered above. We recall the following constraints for an obstacle defined by s planar constraints:

$$\theta_1 s_k - Mb_{k_1} \leq \theta'_1$$
$$\vdots$$
$$\theta_s s_k - Mb_{k_s} \leq \theta'_s$$
$$b_{k_1} + \ldots + b_{k_s} \leq s - 1$$

The last of the constraints, namely:

$$b_{k_1} + \ldots + b_{k_s} \leq s-1$$

needs to be changed to the following:

$$b_{k_1} + \ldots + b_{k_s} - Mb'_k \leq s-1$$
$$b'_k \in \{0,1\}$$

so that just as the original constraint, $$b_{k_1} + \ldots + b_{k_s} \leq s-1,$$

requires that $s_k$ be outside the obstacle, with our modified constraints, $$b'_k = 0$$

implies that $s_k$ is outside the safe zone at time k.
If we set:

$$\theta = \begin{bmatrix} \theta_1 \\ \vdots \\ \theta_s \end{bmatrix}, b_k = \begin{bmatrix} b_{k_1} \\ \vdots \\ b_{k_s} \end{bmatrix}, \theta' = \begin{bmatrix} \theta'_1 \\ \vdots \\ \theta'_s \end{bmatrix}$$

The above inequalities become:

$$\theta s_k - Mb_k \leq \theta'$$
$$b_{k_1} + \ldots + b_{k_s} - Mb'_k \leq s-1$$

We follow similar manipulation steps as shown above to reduce the above constraints to the following:

$$\begin{bmatrix} \theta B & 0 & \cdots & 0 \\ \theta AB & \theta B & \ddots & \vdots \\ \vdots & & \ddots & 0 \\ \theta A^{N-1}B & \cdots & \theta AB & \theta B \end{bmatrix} \begin{bmatrix} u_1 \\ \vdots \\ u_N \end{bmatrix} + \begin{bmatrix} -MI^{s\times s} & 0 & \cdots & 0 \\ 0 & \ddots & \ddots & \vdots \\ \vdots & \ddots & \ddots & 0 \\ 0 & \cdots & 0 & -MI^{s\times s} \end{bmatrix}$$

$$\begin{bmatrix} b_1 \\ \vdots \\ b_N \end{bmatrix} \leq \begin{bmatrix} \theta' - \theta As_0 \\ \vdots \\ \theta' - \theta A^N s_0 \end{bmatrix}$$

$$\begin{bmatrix} [1\cdots 1]_{[1\times s]} & 0 & \cdots & 0 \\ 0 & \ddots & \ddots & \vdots \\ \vdots & \ddots & \ddots & 0 \\ 0 & \cdots & 0 & [1\cdots 1]_{[1\times s]} \end{bmatrix}$$

-continued $$\begin{bmatrix} b_1 \\ \vdots \\ b_N \end{bmatrix} + \begin{bmatrix} -M & 0 & 0 \\ 0 & \ddots & 0 \\ 0 & 0 & -M \end{bmatrix} \begin{bmatrix} b'_1 \\ \vdots \\ b'_N \end{bmatrix} \leq \begin{bmatrix} s-1 \\ \vdots \\ s-1 \end{bmatrix}$$

If we define:

$$S_{A_1} = \begin{bmatrix} \theta B & 0 & \cdots & 0 \\ \theta AB & \theta B & \ddots & \vdots \\ \vdots & & \ddots & 0 \\ \theta A^{N-1}B & \cdots & \theta AB & \theta B \end{bmatrix}, S_{B_1} = \begin{bmatrix} \theta' - \theta A s_0 \\ \vdots \\ \theta' - \theta A^N s_0 \end{bmatrix},$$

$$b_S = \begin{bmatrix} b_1 \\ \vdots \\ b_N \end{bmatrix}, b'_S = \begin{bmatrix} b'_1 \\ \vdots \\ b'_N \end{bmatrix}$$

$$S_{A_2} = \begin{bmatrix} [1 \cdots 1]_{[1 \times s]} & 0 & \cdots & 0 \\ 0 & \ddots & \ddots & \vdots \\ \vdots & \ddots & \ddots & 0 \\ 0 & \cdots & 0 & [1 \cdots 1]_{[1 \times s]} \end{bmatrix}$$

Then the constraints become:

$$-\infty_{[Ns \times 1]} \leq S_{A_1} u - MI^{Ns \times Ns} b_s \leq S_{B_1}$$

$$-\infty_{[N \times 1]} \leq S_{A_2} b_s - MI^{N \times N} b'_s \leq (s-1)_{[N \times 1]}$$

Since in general we have multiple surveillance targets and multiple obstacles, we have multiple safe zones, with each zone associated with a target and an obstacle. We define the above safe zone constraints for each combination of obstacle i and target j:

$$-\infty_{[Nsj \times 1]} \leq S_{A_1}{}^{i,j} u - MI^{Nsj \times Nsj} b_s{}^{i,j} \leq S_{B_1}{}^{i,j}$$

$$-\infty_{[N \times 1]} \leq S_{A_2}{}^{i,j} b_s{}^{i,j} - MI^{N \times N} b'_s{}^{i,j} \leq (s_i - 1)_{[N \times 1]}$$

From an earlier argument, $$b'_k{}^{i,j} = 0$$

implies that the trajectory is outside the safe zone associated with obstacle i and surveillance target j at time k. We have the following constraint for each target $$j \in \{1, \ldots, t\}$$

and time $$k \in \{1, \ldots, N\}:$$

$$b'_k{}^{1,j} + \ldots + b'_k{}^{o,j} - M b_k{}^j \leq 0$$

It is clear that $$b_k{}^j = 0$$

implies that $$b'_k{}^{i,j} = 0$$

for all obstacles $$i \in \{1, \ldots, o\},$$

that is, the trajectory is outside of all the safe zones of target j at time k and is therefore visible to target j. In order to require that, for each surveillance target j, the desired trajectory is outside all of the safe zones associated with that target for at least one time step, we have the following constraint for each target $$j \in \{1, \ldots, t\}:$$

$$b_1{}^j + \ldots + b_N{}^j \leq N - 1$$

This requires that $$b_k{}^j = 0$$

or at least one time step k for each target j. That is, for each surveillance target, the trajectory is within line-of-sight of the target at least once in its trajectory.

If we express the following:

$$-\infty_{[Nsj \times 1]} \leq S_{A_1}{}^{i,j} u - MI^{Nsj \times Nsj} b_s{}^{i,j} \leq S_{B_1}{}^{i,j}$$

$$-\infty_{[N \times 1]} \leq S_{A_2}{}^{i,j} b_s{}^{i,j} - MI^{N \times N} b'_s{}^{i,j} \leq (s_i - 1)_{[N \times 1]}$$

in matrix form for all $$i \in \{1, \ldots, o\}, j \in \{1, \ldots, t \ldots, t\},$$

then we have:

$$\begin{bmatrix} S_{A_1}^{1,1} \\ \vdots \\ S_{A_1}^{o,1} \\ \vdots \\ S_{A_1}^{1,t} \\ \vdots \\ S_{A_1}^{o,t} \end{bmatrix} u + \begin{bmatrix} -MI^{Ns_1} & & & & \\ & \ddots & & & \\ & & -MI^{Ns_o} & & \\ & & & \ddots & \\ & & & & -MI^{Ns_1} \\ & & & & & \ddots \\ & & & & & & -MI^{Ns_o} \end{bmatrix}$$

$$\begin{bmatrix} b_S^{1,1} \\ \vdots \\ b_S^{o,1} \\ \vdots \\ b_S^{1,t} \\ \vdots \\ b_S^{o,t} \end{bmatrix} \leq \begin{bmatrix} S_{B_1}^{1,1} \\ \vdots \\ S_{B_1}^{o,1} \\ \vdots \\ S_{B_1}^{1,t} \\ \vdots \\ S_{B_1}^{o,t} \end{bmatrix} \begin{bmatrix} S_{A_2}^{1,1} & & & & \\ & \ddots & & & \\ & & S_{A_2}^{o,1} & & \\ & & & \ddots & \\ & & & & S_{A_2}^{1,t} \\ & & & & & \ddots \\ & & & & & & S_{A_2}^{o,t} \end{bmatrix}$$

$$\begin{bmatrix} b_S^{1,1} \\ \vdots \\ b_S^{o,1} \\ \vdots \\ b_S^{1,t} \\ \vdots \\ b_S^{o,t} \end{bmatrix} - MI^{Not \times Not} \begin{bmatrix} b'_S^{1,1} \\ \vdots \\ b'_S^{o,1} \\ \vdots \\ b'_S^{1,t} \\ \vdots \\ b'_S^{o,t} \end{bmatrix} \leq \begin{bmatrix} (s_1 - 1)_{[N \times 1]} \\ \vdots \\ (s_o - 1)_{[N \times 1]} \\ \vdots \\ (s_1 - 1)_{[N \times 1]} \\ \vdots \\ (s_o - 1)_{[N \times 1]} \end{bmatrix}$$

If we express the following:

$$b'_k{}^{1,j} + \ldots + b'_k{}^{o,j} - M b_k{}^j \leq 0$$

in matrix form for all $$j \in \{1, \ldots, t\}, k \in \{1, \ldots, N\},$$

and define:

$$b_S^j = \begin{bmatrix} b_1^j \\ \vdots \\ b_N^j \end{bmatrix}$$

we first notice that:

$$\begin{bmatrix} b_1'^{1,j} \\ \vdots \\ b_N'^{1,j} \end{bmatrix} + \ldots + \begin{bmatrix} b_1'^{o,j} \\ \vdots \\ b_N'^{o,j} \end{bmatrix} - M \begin{bmatrix} b_1^j \\ \vdots \\ b_N^j \end{bmatrix} = b_S'^{1,j} + \ldots + b_S'^{o,j} - M b_S^j \leq 0_{N \times 1}$$

so that for all $$j \in \{1, \ldots, t\},$$

we have:

$$[I^{N \times N} \cdots I^{N \times N}] \begin{bmatrix} b_S'^{1,j} \\ \vdots \\ b_S'^{o,j} \end{bmatrix} - M I^{N \times N} b_S^j \leq 0_{N \times 1}$$

Finally, by summing up all $$j \in \{1, \ldots, t\},$$

we have:

$$\begin{bmatrix} [I^{N \times N} \cdots I^{N \times N}]_{N \times No} & & \\ & \ddots & \\ & & [I^{N \times N} \cdots I^{N \times N}]_{N \times No} \end{bmatrix}_{Nt \times Not} \begin{bmatrix} b_S'^{1,1} \\ \vdots \\ b_S'^{o,1} \\ \vdots \\ b_S'^{1,t} \\ \vdots \\ b_S'^{o,t} \end{bmatrix} -$$

$$M I^{Nt \times Nt} \begin{bmatrix} b_S^1 \\ \vdots \\ b_S^t \end{bmatrix} \leq 0_{N \times 1}$$

If we express the remaining constraint:

$$b_1^j + \ldots + b_N^j \leq N-1$$

in matrix form for $$j \in \{1, \ldots, t\},$$

we have:

$$[1 \cdots 1] \begin{bmatrix} b_1^j \\ \vdots \\ b_N^j \end{bmatrix} = [1 \cdots 1] b_S^j \leq N-1$$

so that by summing up all $$j \in \{1, \ldots, t\},$$

we have:

$$\begin{bmatrix} [1 \cdots 1]_{1 \times N} & & \\ & \ddots & \\ & & [1 \cdots 1]_{1 \times N} \end{bmatrix} \begin{bmatrix} b_S^1 \\ \vdots \\ b_S^t \end{bmatrix} \leq (N-1)_{t \times 1}$$

If we set:

$$S_{A1} = \begin{bmatrix} S_{A_1}^{1,1} \\ \vdots \\ S_{A_1}^{o,1} \\ \vdots \\ S_{A_1}^{1,t} \\ \vdots \\ S_{A_1}^{o,t} \end{bmatrix}, S_{A2} = \begin{bmatrix} S_{A_2}^{1,1} & & & & \\ & \ddots & & & \\ & & S_{A_2}^{o,1} & & \\ & & & \ddots & \\ & & & & S_{A_2}^{1,t} \\ & & & & & \ddots \\ & & & & & & S_{A_2}^{o,t} \end{bmatrix}$$

$$S_{A3} = \begin{bmatrix} [I^{N \times N} \cdots I^{N \times N}]_{N \times No} & & \\ & \ddots & \\ & & [I^{N \times N} \cdots I^{N \times N}]_{N \times No} \end{bmatrix}_{Nt \times Not}$$

$$S_{A4} = \begin{bmatrix} [I \cdots I]_{1 \times N} & & \\ & \ddots & \\ & & [I \cdots I]_{1 \times N} \end{bmatrix}_{t \times Nt}$$

$$S_{B1} = \begin{bmatrix} S_{B_1}^{1,1} \\ \vdots \\ S_{B_1}^{o,1} \\ \vdots \\ S_{B_1}^{1,t} \\ \vdots \\ S_{B_1}^{o,t} \end{bmatrix}, S_{B2} = \begin{bmatrix} (s_1-1)_{[N \times 1]} \\ \vdots \\ (s_o-1)_{[N \times 1]} \\ \vdots \\ (s_1-1)_{[N \times 1]} \\ \vdots \\ (s_o-1)_{[N \times 1]} \end{bmatrix} x_{S1} = \begin{bmatrix} b_S^{1,1} \\ \vdots \\ b_S^{o,1} \\ \vdots \\ b_S^{1,t} \\ \vdots \\ b_S^{o,t} \end{bmatrix},$$

$$x_{S2} = \begin{bmatrix} b_S'^{1,1} \\ \vdots \\ b_S'^{o,1} \\ \vdots \\ b_S'^{1,t} \\ \vdots \\ b_S'^{o,t} \end{bmatrix}, x_{S3} = \begin{bmatrix} b_S^1 \\ \vdots \\ b_S^t \end{bmatrix}$$

then we have:

$$\begin{bmatrix} -\infty_{Nt(s_1+\cdots+s_o) \times 1} \\ -\infty_{Not \times 1} \\ -\infty_{Nt \times 1} \\ -\infty_{t \times 1} \end{bmatrix} \leq \begin{bmatrix}$$

-continued $$\begin{bmatrix} S_{A1} & -MI^{Nt(s_1+\cdots+s_o)} & 0 & 0 \\ 0 & S_{A2} & -MI^{Not} & 0 \\ 0 & 0 & S_{A3} & -MI^{Nt \times Nt} \\ 0 & 0 & 0 & S_{A4} \end{bmatrix} \begin{bmatrix} u \\ x_{S1} \\ x_{S2} \\ x_{S3} \end{bmatrix} \leq \begin{bmatrix} S_{B1} \\ S_{B2} \\ 0_{Nt \times 1} \\ (N-1)_{t \times 1} \end{bmatrix}$$

and if we augment our new surveillance target visibility constraints to our existing MILP problem formulation, expressed in symbolic form as:

$$\min_x f(x) = c^T x$$

$$b_L \leq Ax \leq b_U$$

$$x_L \leq x \leq x_U$$

then we have:

$$\min_x f(x) = \begin{bmatrix} c \\ 0_{Nt(s_1+\cdots+s_o) \times 1} \\ 0_{Not \times 1} \\ 0_{Nt \times 1} \end{bmatrix}^T \begin{bmatrix} x \\ x_{S1} \\ x_{S2} \\ x_{S3} \end{bmatrix}$$

$$\begin{bmatrix} -\infty_{Nt(s_1+\cdots+s_o) \times 1} \\ -\infty_{Not \times 1} \\ -\infty_{Nt \times 1} \\ -\infty_{t \times 1} \end{bmatrix} \leq \begin{bmatrix} A & 0 & 0 & 0 \\ [S_{A1} \, 0] & -MI^{Nt(s_1+\cdots+s_o)} & 0 & 0 \\ 0 & S_{A2} & -MI^{Not} & 0 \\ 0 & 0 & S_{A3} & -MI^{Nt \times Nt} \\ 0 & 0 & 0 & S_{A4} \end{bmatrix} \begin{bmatrix} x \\ x_{S1} \\ x_{S2} \\ x_{S3} \end{bmatrix} \leq \begin{bmatrix} b_U \\ S_{B1} \\ S_{B2} \\ 0_{Nt \times 1} \\ (N-1)_{t \times 1} \end{bmatrix}$$

$$\begin{bmatrix} x_L \\ 0_{Nt(s_1+\cdots+s_o) \times 1} \\ 0_{Not \times 1} \\ 0_{Nt \times 1} \end{bmatrix} \leq \begin{bmatrix} x \\ x_{S1} \\ x_{S2} \\ x_{S3} \end{bmatrix} \leq \begin{bmatrix} x_U \\ 1_{Nt(s_1+\cdots+s_o) \times 1} \\ 1_{Not \times 1} \\ 1_{Nt \times 1} \end{bmatrix}$$

Safe zones are easier to calculate than unsafe zones because the overall safe zone for multiple threats and multiple obstacles is the intersection of the union of safe zones, with each of the unions associated with a threat. Furthermore, the safe zone associated with one threat and one obstacle can be calculated individually. This can be done in algorithmic form.

The following is description for this procedure:

1. For each face of polyhedral (obstacle), check if it faces threat. The dot product of the normal of the face n and the vector originating from the threat t to any point on the face p must be negative, namely, $n \cdot (p-t) < 0$.

2. If it does, find all edges that border faces that don't face the threat. The determination of whether the border faces actually face the threat is similar.

3. For each of these edges, it is defined by two end points p1, p2 combined with threat point t (3 total). This defines a plane. In general, a plane can be defined by the equation $n \cdot p = n \cdot p^*$, where n is the normal of the plane, $p = \{x, y, z\}$, and p* is any point on the plane. For a planar boundary in the form $n \cdot p \geq n \cdot p^*$, we follow the convention that the normal n points outside the object, so that points denoting the edges of the face need to be assigned to p1 and p2 in a counterclockwise fashion, as seen by the threat. For example, for the left most edge of the left face of the pyramid 90 of FIG. 11, as seen by the eye (the threat), p1 would be the top of the pyramid and p2 would be at the base. We use this to define a planar boundary by setting $n=(p1-t) \times (p2-t)$ and by setting $p^*=t$.

4. The collection of these planes, plus the aforementioned "front faces" make up the boundaries for a safe zone.

We may define some obstacles to be bottomless, where we rely on the ground plane to bound the bottom of the obstacle. In this case, we would still need "virtual" or abstract points at the bottom of the obstacle to allow us to properly define the side edges using the above algorithm. We would never define any edge based on any two abstract points, however, because we have no need to bound the safe zone from below the ground plane.

Due to the complexity of a typical obstacle avoidance problem and the need to solve it in real-time, the overall obstacle avoidance problem is best solved in smaller parts. Consider an all-encompassing MILP obstacle avoidance problem with a small time discretization value (T) and long planning horizon (N), so that the problem can account for small obstacles and still maintain a big picture view of the obstacle field and terrain. This problem would be very large and would require a long solve time.

More reasonable solve times can be achieved while retaining the desired effects of small time discretization and long planning horizon by constructing and solving a number of smaller, simpler MILP problems in series. Doing so takes advantage of an important property of an obstacle avoidance problem, in that it is inherently of multiple timescales. That is, using the concept of abstraction, the problem can be naturally decomposed into subproblems of largest timescales (terrain navigation), medium timescales (urban obstacle avoidance), and smallest timescales (rounding corners of buildings, skimming surface of terrain, and avoiding trees and small objects). The longer timescale problems would perform longer range planning such as terrain navigation, while the shorter timescale problems would refine the solutions provided by the longer timescale problems to account for smaller obstacles.

Figure 13:
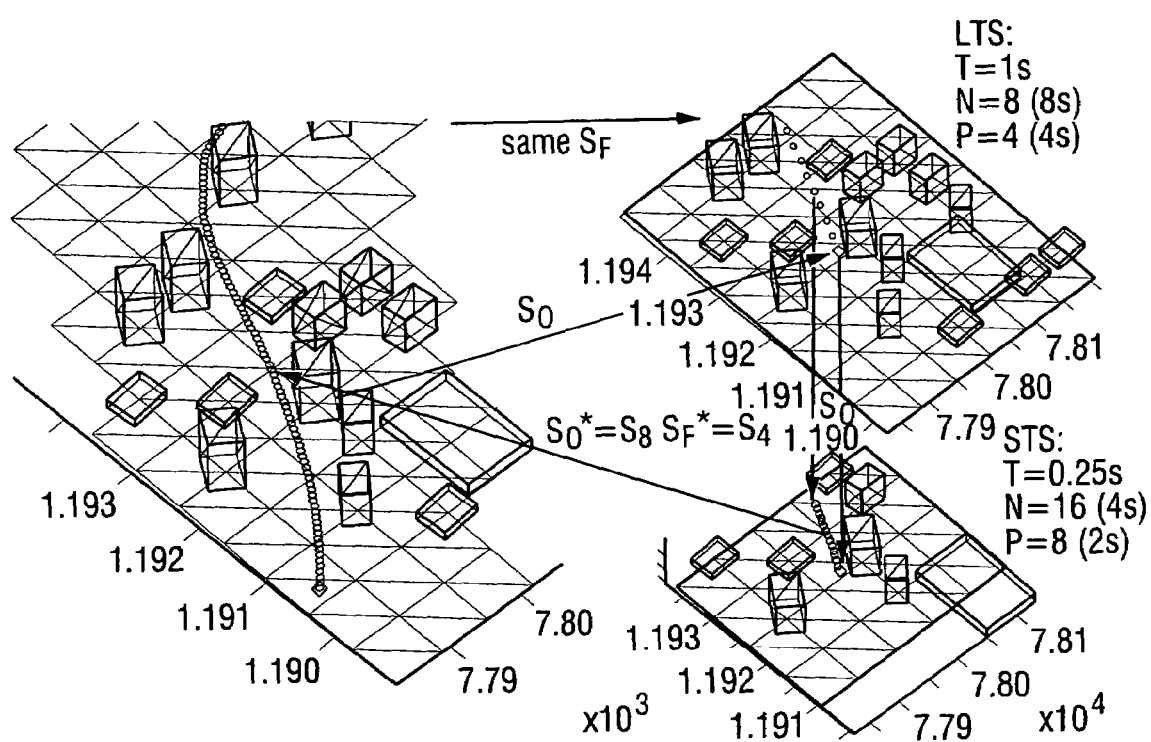
FIG. 13 is a schematic representation of threat avoidance with multiple threats and obstacles.

FIG. 13 illustrates the concept of multiple timescales with a two timescale example. This introduces the notion of an execution horizon, which denotes the subset of the planned trajectory to be executed. In general, the execution horizon is shorter than the planning horizon, but they can be equal. In conjunction with time discretization (T) and planning horizon (N), these three parameters determine how the problems from different timescales will be integrated. The sequence starts when the longest timescale MILP path planning problem is formulated and solved with $s_o$ at the current vehicle location, and SF the true destination. The solution at the end of its execution horizon is taken as the destination SF for the next shorter timescale problem, reusing the same $s_o$. The solution at the end of the new problem's execution horizon is then taken as the $s_F$ of the next one, and so on, while reusing the same $s_o$. This sequence ends when the solution of the shortest timescale solution is given as a series of waypoints for the vehicle to follow. When the vehicle reaches the waypoint corresponding to the end of the shortest timescale problem's execution horizon, this location is designated the new $s_o$ and the entire sequence starts anew, until the true destination is reached or changed.

Next consider non-uniform time steps. Notice that many of the MILP constraints presented in the previous sections are based on the following equations:

$$s_1 = As_o + Bu_1$$

$$s_2 = A^2 s_o + ABu_1 + Bu_2$$

$$s_3 = A^3 s_o + A^2 Bu_1 + ABu_2 + Bu_3$$

$$\ldots$$

$$s_k = A^k s_o + A^{k-1} Bu_1 + \ldots + ABu_{k-1} + Bu_k$$

That is, every type of MILP constraints (i.e. for altitude) is instantiated for each time step $i \in \{1, \ldots, N\}$ of the MILP problem. This is because the MILP problem is posed as an optimization problem for a path consisting of the trajectory point $s_k$ for each time step $k \in \{1, \ldots, N\}$. This uniform stepping of time is not required, and not always desirable. For instance, for an identically-sized MILP problem one might prefer a nonlinear scaling of time so that time is more sparsely captured further into the future and more finely represented closer to the present. For example, instead of planning for $s_k$, $k \in \{1, \ldots, N\}$ we can have $k \in \{1, 2, 4, 8, \ldots\}$. We can achieve this by doing the following:

$$s_1 = As_0 + Bu_1$$

$$s_2 = A^2 s_0 + ABu_1 + Bu_2$$

$$s_4 = A^4 s_0 + A^3 Bu_1 + A^2 Bu_2 + ABu_4 + Bu_4$$

$$s_8 = A^8 s_0 + ABu_1 + A^6 Bu_2 + A^5 Bu_4 + A^4 Bu_4 + A^3 Bu_8 + A^2 Bu_8 + ABu_8 + Bu_8$$

By choosing a coarser representation of time further into the future, the problem is now simplified by having to plan for fewer time steps because the controls $u_k$ for multiple time steps are combined into one (i.e. $u_3 = u_4$). With this method of non-uniform time steps, we are able to construct a MILP problem with the same planning horizon with fewer time steps and therefore smaller problem size, or alternatively, for a problem with the same problem size, we can have a longer planning horizon.

While the invention has been described in terms of particular embodiments, it will be apparent to those skilled in the art that various changes can be made to the disclosed embodiments without departing from the invention as set forth in the following claims.

What is claimed is:

1. A method of planning a path of a vehicle, the method comprising the steps of:
    defining a first plurality of constraints representing dynamics of the vehicle;
    defining a second plurality of constraints representing collisions with obstacles;
    defining a third plurality of constraints representing visibility to threats; and
    using the first, second and third plurality of constraints with mixed integer linear programming to generate a trajectory for the vehicle from a starting point to a destination point in an environment containing the obstacles and the threats.

2. The method of claim 1, wherein the first plurality of constraints comprise continuous constraints including one or more of:
    velocity constraints, slack variable constraints for energy and time, and control limits.

3. The method of claim 1, wherein the second plurality of constraints are integer constraints.

4. The method of claim 1, wherein the mixed integer linear programming is implemented as a receding horizon algorithm.

5. The method of claim 1, further comprising the step of:
    associating a cost to the trajectory that is proportional to the altitude at each of a plurality of points between the starting point and the destination point.

6. The method of claim 1, wherein trajectory is a nap-of-the-earth trajectory that utilizes obstacles to minimize detection of a vehicle.

7. The method of claim 1, wherein the mixed integer linear programming is implemented using multiple time scales.

8. The method of claim 7, wherein a longest one of the multiple time scales is implemented first.

9. The method of claim 1, further comprising the steps of:
    defining a fourth plurality of constraints representing terrain; and
    using the fourth plurality of constraints with the mixed integer linear programming to generate the trajectory.

10. The method of claim 1, wherein the third plurality of constraints are modeled as either safe zones or unsafe zones.

11. The method of claim 10, wherein each safe zone is bounded by sides of an obstacle that face the threat and planes that intersect the threat and edges of the sides.

12. A method of controlling a path of a vehicle, the method comprising the steps of:
    defining a first plurality of constraints representing dynamics of the vehicle;
    defining a second plurality of constraints representing collision constraints with obstacles;
    defining a third plurality of constraints representing visibility to threats; and
    using the first, second and third plurality of constraints and mixed integer linear programming to generate a set of control actions to move the vehicle from a starting point to a destination point.

13. The method of claim 12, wherein the first plurality of constraints comprise continuous constraints including one or more of:
    velocity constraints, slack variable constraints for energy and time, and control limits.

14. The method of claim 12, wherein the second plurality of constraints are integer constraints.

15. The method of claim 12, wherein the mixed integer linear programming is implemented as a receding horizon algorithm.

16. The method of claim 12, further comprising the step of:
    associating a cost to the trajectory that is proportional to the altitude at each of a plurality of points between the starting point and the destination point.

17. The method of claim 12, wherein trajectory is a nap-of-the-earth trajectory that utilizes obstacles to minimize detection of a vehicle.

18. The method of claim 12, wherein the mixed integer linear programming is implemented using multiple time scales.

19. The method of claim 18, wherein a longest one of the multiple time scales is implemented first.

20. The method of claim 12, further comprising the steps of:
defining a fourth plurality of constraints representing terrain; and
using the fourth plurality of constraints with the mixed integer linear programming to generate the trajectory.

21. The method of claim 12, wherein the third plurality of constraints are modeled as either safe zones or unsafe zones.

22. The method of claim 21, wherein each safe zone is bounded by sides of an obstacle that face the threat and planes that intersect the threat and edges of the sides.

* * * * *

UNITED STATES PATENT AND TRADEMARK OFFICE
CERTIFICATE OF CORRECTION

PATENT NO.       : 7,248,952 B2
APPLICATION NO.  : 11/060347
DATED            : July 24, 2007
INVENTOR(S)      : Cedric Sek-Kong Ma and Robert Henry Miller It is certified that error appears in the above-identified patent and that said Letters Patent is hereby corrected as shown below:

Title Page

(74) Attorney, Agent, or Firm – Robert P. Lenart, Esq.; "Pietragalio, Bosick & Gordon LLP" should read -- Pietragallo Bosick & Gordon, LLP --.

Detailed Description of the Invention

Column 3,
Equation (1) should read $$-- \min_{x} f(x) = c^T x \qquad (1) --$$

Column 5,
Equation (15) should read $$-- u_k - v_k \leq 0, \; -u_k - v_k \leq 0 \qquad (15) --$$

Column 5,
Equation (16) should read $$-- W(A^{k-1}Bu_o + \cdots + ABu_{k-2} + Bu_{k-1}) - w_k \leq W(s_F - A^k s_o)$$

$$- W(A^{k-1}Bu_o + \cdots + ABu_{k-2} + Bu_{k-1}) - w_k \leq -W(s_F - A^k s_o) \qquad (16) --$$

Column 6, Line 59,
"...first subproblem is executed (i.e. only $s_1$ and $s_2$)  Then $s_2$ from the..." should read
--...first subproblem is executed (i.e. only $s_1$ and $s_2$). Then $s_2$ from the...--

UNITED STATES PATENT AND TRADEMARK OFFICE
CERTIFICATE OF CORRECTION

PATENT NO. : 7,248,952 B2
APPLICATION NO. : 11/060347
DATED : July 24, 2007
INVENTOR(S) : Cedric Sek-Kong Ma and Robert Henry Miller It is certified that error appears in the above-identified patent and that said Letters Patent is hereby corrected as shown below:

Column 19, Lines 13-15,
Paragraph should read:

-- Next consider the Obstacle Integer Constraints. Assume a rectangular box in 3-D defined by:
$$x_{\min} < x < x_{\max}$$
$$y_{\min} < y < y_{\max}$$
$$z_{\min} < z < z_{\max}$$
--

Column 21, Lines 10-19,
Paragraph should read:

-- We can arrive at the same conclusion by using the auxiliary matrices and variables:

$$z \geq -x+1 \Leftrightarrow a=-1, b=0, d_{\max}=1 \Leftrightarrow \underbrace{[-1\ 0\ -1\ 0\ 0\ 0]}_{\theta_1} \quad s_k - Mb_{k_1} \leq \underbrace{-1}_{\theta'_1}$$

$$z \geq x+1 \Leftrightarrow a=1, b=0, d_{\max}=1 \Leftrightarrow \underbrace{[1\ 0\ -1\ 0\ 0\ 0]}_{\theta_2} \quad s_k - Mb_{k_2} \leq \underbrace{-1}_{\theta'_2}$$

$$z \geq -y+1 \Leftrightarrow a=0, b=-1, d_{\max}=1 \Leftrightarrow \underbrace{[0\ -1\ -1\ 0\ 0\ 0]}_{\theta_1} \quad s_k - Mb_{k_3} \leq \underbrace{-1}_{\theta'_3}$$

$$z \geq y+3 \Leftrightarrow a=0, b=1, d_{\max}=1 \Leftrightarrow \underbrace{[0\ 1\ -1\ 0\ 0\ 0]}_{\theta_4} \quad s_k - Mb_{k_4} \leq \underbrace{-1}_{\theta'_4}$$

$$z \leq 0 \Leftrightarrow z_{\min}=0 \Leftrightarrow \underbrace{[0\ 0\ 1\ 0\ 0\ 0]}_{\theta_5} \quad s_k - Mb_{k_5} \leq \underbrace{0}_{\theta'_5}$$

--

Column 23, Line 35,
Insert the following:

-- Combining all the composite matrices we have from the previous sections, we have the final MILP problem formulation. --

Column 25, Line 50, should read
-- In place of restricting the vehicle to be at the destination at the end of the planning horizon, we encourage the vehicle to get closer to the destination [SF] $\underline{s_F}$ by modifying the cost function to include a terminal cost: --

UNITED STATES PATENT AND TRADEMARK OFFICE
CERTIFICATE OF CORRECTION

PATENT NO.       : 7,248,952 B2                                    Page 3 of 5
APPLICATION NO.  : 11/060347
DATED            : July 24, 2007
INVENTOR(S)      : Cedric Sek-Kong Ma and Robert Henry Miller It is certified that error appears in the above-identified patent and that said Letters Patent is hereby corrected as shown below:

Column 26, Line 40,
The equation should read:

$$-- \quad w_N = \left\| \begin{matrix} x_N - x_F \\ y_N - y_F \\ z_N - z_F \end{matrix} \right\|_1.\quad --$$

Column 27, Line 32,
Paragraph should read:

-- We have, after some rearrangements:

$$(W A^{N-1} B u_1 + \cdots + W A B u_{N-1} + W B u_N) - w_N \leq W(s_F - A^N s_0)$$

$$-(W A^{N-1} B u_1 + \cdots + W A B u_{N-1} + W B u_N) - w_N \leq -W(s_F - A^N s_0) \quad --$$

Column 29, Line 30,
Second Part of Equation should read:
--

$$\begin{bmatrix} -\infty_{3N\times 1} \\ -\infty_{3N\times 1} \\ -\infty_{3N\times 1} \\ -\infty_{3N\times 1} \\ V_{B_L} \\ -\infty_{Nn_1\times 1} \\ -\infty_{N\times 1} \\ \vdots \\ -\infty_{Nn_p\times 1} \\ -\infty_{N\times 1} \end{bmatrix} \leq \begin{bmatrix} I^{3N\times 3N} & -I^{3N\times 3N} & 0 & 0 & \cdots & 0 \\ -I^{3N\times 3N} & -I^{3N\times 3N} & 0 & 0 & \cdots & 0 \\ W'_A & 0 & -I^{3N\times 3N} & 0 & \cdots & 0 \\ -W'_A & 0 & -I^{3N\times 3N} & 0 & \cdots & 0 \\ V_A & 0 & 0 & 0 & \cdots & 0 \\ \theta^1_{A_1} & 0 & 0 & -M I^{Nn_1\times Nn_1} & & \\ 0 & 0 & 0 & \theta^1_{A_2} & & \\ \vdots & \vdots & \vdots & & \ddots & \\ \theta^p_{A_1} & 0 & 0 & & & -M I^{Nn_p\times Nn_p} \\ 0 & 0 & 0 & & & \theta^p_{A_2} \end{bmatrix} \begin{bmatrix} u \\ v \\ w' \\ b_1 \\ \vdots \\ b_P \end{bmatrix} \leq \begin{bmatrix} 0_{3N\times 1} \\ 0_{3N\times 1} \\ W'_B \\ -W'_B \\ V_{B_U} \\ \theta^1_{B_1} \\ (n_1-1)_{N\times 1} \\ \vdots \\ \theta^p_{B_1} \\ (n_p-1)_{N\times 1} \end{bmatrix} \quad --$$

Column 37, Line 66, should read
-- As for the former scenario, one can only call the problem an [illconditioned] <u>ill-conditioned</u> one because we are asking the vehicle to achieve the impossible. --

UNITED STATES PATENT AND TRADEMARK OFFICE
CERTIFICATE OF CORRECTION

PATENT NO. : 7,248,952 B2
APPLICATION NO. : 11/060347
DATED : July 24, 2007
INVENTOR(S) : Cedric Sek-Kong Ma and Robert Henry Miller It is certified that error appears in the above-identified patent and that said Letters Patent is hereby corrected as shown below:

Column 39, Line 40,
Paragraph should read:

-- The overall safe zone would be the following:

$$(S_1^1 \cup \cdots \cup S_1^o) \cap \cdots \cap (S_t^1 \cup \cdots \cup S_t^o)$$

--

Column 40, Line 15,
Equation should read:

$$b_k^{box} = 0 \Rightarrow k_{k_{x_{min}}} = b_{k_{y_{min}}} = b_{k_{z_{min}}} = b_{k_{x_{max}}} = b_{k_{y_{max}}} = b_{k_{z_{max}}} = 0$$
$$\Rightarrow -x \leq -x_{min}, x \leq x_{max} \Rightarrow x_{min} \leq x \leq x_{max}$$
$$-y \leq -y_{min}, y \leq y_{max} \Rightarrow y_{min} \leq y \leq y_{max}$$
$$-z \leq -z_{min}, z \leq z_{max} \Rightarrow z_{min} \leq z \leq z_{max}$$

--

Column 41, Line 51,
Equation should read:

$$j \in \{1,\cdots,t\}.$$

$$-\infty_{[Ns_i \times 1]} \leq T_{A_1}^{i,j} u - M I^{Ns_i \times Ns_i} b_T^{i,j} \leq T_{B_1}^{i,j}$$
$$-\infty_{[N \times 1]} \leq T_{A_2}^{i,j} b_T^{i,j} - M I^{N \times N} b_T'^{i,j} \leq 0_{[N \times 1]}$$

--

Column 53, Lines 66-67,
"In general, a plane can be defined..." should read:

-- In general, a plane can be defined by the equation $n \bullet p = n \bullet p^*$, where $n$ is the normal of the plane, $p = \{x, y, z\}$, and $p^*$ is any point on the plane. --

Column 54, Line 56, should read
-- ...current vehicle location, and [SF] $\underline{S_F}$ the true destination. The... --

UNITED STATES PATENT AND TRADEMARK OFFICE
CERTIFICATE OF CORRECTION

PATENT NO. : 7,248,952 B2
APPLICATION NO. : 11/060347
DATED : July 24, 2007
INVENTOR(S) : Cedric Sek-Kong Ma and Robert Henry Miller It is certified that error appears in the above-identified patent and that said Letters Patent is hereby corrected as shown below:

Column 54, Line 58, should read
-- ...destination [SF] $\underline{S_F}$ for the next shorter timescale problem,... --

Column 55, Line 4,
First Equation should read:

$$-- s_1 = A\, s_o + Bu_1 --$$

Column 55, Line 31,
Fourth Equation should read:

$$-- s_8 = A^8 s_0 + A^7 Bu_1 + A^6 Bu_2 + A^5 Bu_4 + A^4 Bu_4 + A^3 Bu_8 + A^2 Bu_8 + ABu_8 + Bu_8 --$$

Signed and Sealed this

Fifteenth Day of April, 2008

JON W. DUDAS
*Director of the United States Patent and Trademark Office*